US010767412B2

(12) United States Patent
Scheuring et al.

(10) Patent No.: US 10,767,412 B2
(45) Date of Patent: Sep. 8, 2020

(54) ELECTROMECHANICAL STRUT WITH POWER ACTUATOR HAVING SUPPLEMENTAL FRICTION CONTROL

(71) Applicant: MAGNA CLOSURES INC., Newmarket (CA)

(72) Inventors: Joseph Scheuring, Richmond Hill (CA); Wieslaw Nowicki, Mississauga (CA)

(73) Assignee: MAGNA CLOSURES INC., Newmarket, Ontario (CA)

( * ) Notice: Subject to any disclaimer, the term of this patent is extended or adjusted under 35 U.S.C. 154(b) by 29 days.

(21) Appl. No.: 16/238,150

(22) Filed: Jan. 2, 2019

(65) Prior Publication Data

US 2019/0211605 A1 Jul. 11, 2019

Related U.S. Application Data

(60) Provisional application No. 62/614,604, filed on Jan. 8, 2018.

(51) Int. Cl.
*B60J 5/10* (2006.01)
*E05F 15/622* (2015.01)
*E05F 15/70* (2015.01)

(52) U.S. Cl.
CPC ............... *E05F 15/622* (2015.01); *B60J 5/10* (2013.01); *E05F 15/70* (2015.01); *E05Y 2201/21* (2013.01); *E05Y 2201/216* (2013.01); *E05Y 2201/26* (2013.01); *E05Y 2201/72* (2013.01); *E05Y 2800/232* (2013.01); *E05Y 2800/234* (2013.01); *E05Y 2800/236* (2013.01); *E05Y 2800/244* (2013.01); *E05Y 2900/546* (2013.01)

(58) Field of Classification Search
CPC .................. B60J 5/10; E05Y 2900/546; E05Y 2900/548; E05Y 2800/232; E05Y 2800/234; E05Y 2800/236; E05Y 2201/26; E05Y 2201/21; E05Y 2201/72; E05Y 2201/216; E05F 15/622
USPC ................. 296/106, 56, 146.4; 49/343, 344; 188/300; 267/196, 210, 205, 207
See application file for complete search history.

(56) References Cited

U.S. PATENT DOCUMENTS 5,002,172 A 3/1991 Stringer
5,267,416 A 12/1993 Davis
5,673,593 A 10/1997 Lafferty
(Continued)

*Primary Examiner* — Dennis H Pedder
(74) *Attorney, Agent, or Firm* — Dickinson Wright PLLC

(57) ABSTRACT

An electromechanical strut is provided for moving a pivotal closure member between open and closed positions relative to a motor vehicle body. The electromechanical strut includes a drive mechanism having a motor-gearbox assembly, flex coupling assembly, and a spring-loaded supplemental friction assembly that are operable to drive a rotatable power screw. The drive mechanism converts rotary motion of the power screw into linear motion of an extensible member to move the extensible member between a retracted position corresponding to the closure member closed position and an extended position corresponding to the closure member open position. The motor-gearbox assembly includes a motor and a geartrain having an output component driven at a reduced speed relative to the motor speed. The flex coupling assembly is operably disposed between the output component and the power screw. The spring-loaded supplemental friction assembly generates and applies a supplemental frictional force to the flex coupling assembly.

20 Claims, 32 Drawing Sheets

(56) References Cited

U.S. PATENT DOCUMENTS

| | | | |
|---|---|---|---|
| 6,516,567 | B1 | 2/2003 | Stone et al. |
| 6,814,392 | B1 | 11/2004 | Tomaszewski |
| 7,070,226 | B2 | 7/2006 | Cleland et al. |
| 7,234,757 | B2 | 6/2007 | Mitchell |
| 7,566,092 | B2 | 7/2009 | Paton et al. |
| 7,938,473 | B2 | 5/2011 | Paton et al. |
| 8,006,817 | B2 | 8/2011 | Hanna et al. |
| 9,776,483 | B2 | 10/2017 | Shchokin et al. |
| 9,945,168 | B2 | 4/2018 | Leonard et al. |
| 9,976,332 | B2 | 5/2018 | Scheuring et al. |
| 10,100,568 | B2 | 10/2018 | Scheuring et al. |
| 10,280,674 | B2 | 5/2019 | Leonard et al. |
| 2004/0084265 | A1 | 5/2004 | Muller et al. |
| 2012/0000304 | A1 | 1/2012 | Hamminga et al. |

ELECTROMECHANICAL STRUT WITH POWER ACTUATOR HAVING SUPPLEMENTAL FRICTION CONTROL

CROSS-REFERENCE TO RELATED APPLICATION

This application claims the benefit of U.S. Provisional Application Ser. No. 62/614,604, filed Jan. 8, 2018, which is incorporated herein by reference in its entirety.

FIELD

The present disclosure relates generally to power lift gate systems in motor vehicles. More particularly, the present disclosure is directed to a power-operated electromechanical strut equipped with a motor-gearbox assembly having a spring-loaded supplemental friction mechanism operable to provide an improved stop and hold functionality.

BACKGROUND

This section provides background information which is not necessarily prior art to the inventive concepts associated with the present disclosure.

Lift gates provide convenient access to the cargo areas of hatchbacks, wagons, and other utility vehicles. Typically, the lift gate is hand operated and requires manual effort to be moved between open and closed positions. Depending on the size and weight of the lift gate, this effort can be difficult for some users. Additionally, manually opening or closing a lift gate can be inconvenient, particularly when the user's hands are occupied.

To reduce the effort and inconvenience of manually opening a lift gate, gas struts can be mounted between the vehicle body and the lift gate to reduce the force required to raise the lift gate. However, gas struts also hinder efforts to subsequently close the lift gate since the gas struts re-pressurize upon closing, thereby increasing the effort required. Additionally, the efficacy of gas struts varies according to the ambient temperature. Furthermore, the use of gas struts still requires that the lift gate is manually opened and closed.

As an alternative to manually-operated lift gates, some vehicles are equipped with a power lift gate system which typically include one or more power actuators configured to apply a force to the lift gate to control movement between the open and closed position. For example, U.S. Pat. No. 6,516,567 discloses a power actuator that works in tandem with a gas strut. The power actuator includes an electric motor mounted within the vehicle body that is coupled, via a flexible rotary cable, to an extensible strut that is pivotally mounted between the vehicle body and the lift gate. The electric motor can be controlled to raise and lower the lift gate without manual effort. A controller unit controls actuation of the electric motor and can be in communication with a remote key fob button or a button located in the passenger compartment or on the lift gate itself. However, this type of power actuator is not without its disadvantages. For example, the vehicle body must be specifically designed to provide a space to house the electric motor. Due to the limited space available, the motor is typically small and underpowered, thereby still requiring the assistance of a gas strut. Additionally, because the power actuator is designed to work in tandem with a gas strut, the gas strut can still vary in efficacy due to temperature. As such, the electric motor must be balanced to provide the correct amount of power with varying degrees of mechanical assistance from the gas strut.

U.S. Publication No. US2004/0084265 provides various examples of electromechanical power actuators for power lift gate systems. These electromechanical power actuators include an electric motor and a first reduction gearset coupled via a flexible rotary cable to a second reduction gearset which, in turn, is coupled via a slip clutch to a rotatable piston rod. Rotation of the piston rod causes a spindle drive mechanism to translate an extensible strut that is adapted to be pivotally mounted between the vehicle body and the lift gate. The slip clutch functions to permit the piston rod to rotate relative to the second gearset when a torque exceeding its preload is exerted on the lift gate so as to accommodate manual operation of the lift gate without damaging the electromechanical power actuator. A helical compression spring is installed in the power actuator to provide a counter balancing force against the weight of the lift gate.

U.S. Publication No. US2012/0000304 discloses several embodiments of power-operated drive mechanisms for moving trunk lids and lift gates between open and closed positions. The power-operated drive mechanisms have an offset configuration employing an electric motor-driven worm gearset to rotate an externally-threaded jackscrew for translating an extensible strut. A slip clutch is shown to be disposed between an output gear of the worm gearset and the rotatable jackscrew. In addition, a coupler unit is provided between the motor output shaft and the worm of the worm gearset. The coupler unit includes a first coupler member fixed for rotation with the worm shaft, a second coupler member fixed for rotation with the motor output shaft, and a resilient spider member interdigitated between fingers extending from the first and second coupler members. The coupler unit provides axial and circumferential isolation between the first and second coupler members and functions to absorb transient or torsional shock loads between the motor shaft and the worm shaft. While use of such a coupler unit provides enhanced damping characteristics and accommodates mis-alignments, the addition of such a coupler unit to the power-operated drive mechanism increases packaging requirements and assembly complexity.

Many such electromechanical power actuators require significant friction to provide a "stop and hold" lift gate function throughout the entire range of pivotal lift gate travel, regardless of environmental conditions and the vehicle grade. Typically, this friction is associated with the spindle-type drive mechanism, and not in the counterbalance mechanism, because the power lift gate system is either a dual drive arrangement or the friction limit on the counterbalance mechanism has already been reached. Specifically, back-drive friction can be added to the spindle-type drive mechanism by increasing the gear ratio associated with the reduction gearbox or by reducing the lead of the rotary power screw associated with the spindle-type drive mechanism. However, increasing these ratios also increases the motor size and speed requirements which can ultimately result in undesirable noise and back-EMF being generated by the motor during a manual closing of the lift gate.

While electromechanical struts currently used in powered lift gate closure systems provide enhanced convenience over non-powered manual lift gate closure systems, a need exists to continue development of improved power actuators which obviate or mitigate one or more of the shortcomings associated with prior art power actuators.

SUMMARY

This section provides a general summary of the disclosure and is not a comprehensive disclosure of its full scope or all of its features, aspects or objectives.

Accordingly, it is an aspect of the present disclosure to provide an electromechanical strut for use with a powered closure system in a motor vehicle for controlling movement of a closure member between an open position and a closed position relative to a motor vehicle body.

It is a related aspect of the present disclosure to provide an electromechanical strut for use in a power lift gate system of a motor vehicle.

It is a further related aspect of the present disclosure to provide such an electromechanical strut with a power drive unit and a telescoping unit that is driven by the power drive unit.

It is a further aspect of the present disclosure to provide such an electromechanical strut with a power unit having a motor-gearbox assembly integrating an electric motor and reduction gearbox into a common assembly.

It is a further aspect of the present disclosure to provide such an electromechanical strut with a telescoping unit having a spindle-type rotary-to-linear conversion device equipped with a rotary power screw and an extensible strut mechanism.

It is a further related aspect of the present disclosure to equip the motor-gearbox assembly with a spring-loaded supplemental friction mechanism that is located between the gearbox and the rotary power screw to provide enhanced "stop and hold" lift gate functionality. In one non-limiting arrangement, the spring-loaded supplemental friction mechanism is configured to act on a flex coupling assembly located between a rotary output component of the gearbox and a rotary input to the power screw.

It is a related aspect of the present disclosure that the flex coupling assembly establish a first drive interface with the output component of the gearbox and also establish a second drive interface with the rotary input of the rotary-to-linear conversion device. The first drive interface is established by drive lugs formed on a first coupler member being seated in first slots formed in a resilient coupling member. Likewise, the second connection drive is established by driven lugs formed on the rotary input to the rotary-to-linear conversion device being seated in second slots formed in the coupling member.

As a further aspect of the present disclosure, the gearbox has a dual-stage planetary geartrain configured such that a first stage gearset is driven by a rotary output of the electric motor unit and a second stage gearset is driven by the first stage gearset to provide a torque multiplication and speed reduction function between the rotary output of the electric motor unit and the rotary input of a rotary-to-linear conversion device. The flexible coupling assembly is operably disposed between the second stage gearset and the rotary input.

In accordance with these and other aspects, the present disclosure is directed to an electromechanical strut for moving a pivotal closure member between an open position and a closed position relative to a motor vehicle body. The electromechanical strut includes a housing operably connected to one of the closure member and the motor vehicle body and an extensible member slideably moveable relative to the housing, with the extensible member being operably connected to the other one of the closure member and the motor vehicle body. The electromechanical strut further includes a motor-gearbox assembly operable for converting rotation of a drive member into linear motion of the extensible member for moving the extensible member between a retracted position relative to the housing, which corresponds to the closed position of the closure member, and an extended position relative to the housing, which corresponds to the open position of the closure member. The motor-gearbox assembly includes an electric motor having a rotary output member, a gearbox having a geartrain with an input component driven by the rotary output member of the electric motor and an output component driven at a reduced speed relative to the input component, a coupling assembly for coupling the output component of the geartrain to the drive member, and a supplemental friction mechanism for applying a supplemental frictional force to at least one of the geartrain and the coupling assembly.

In the electromechanical strut of the present disclosure, the coupling assembly includes a first coupling member fixed for rotation with the output component of the geartrain, a second coupling member fixed for rotation with the drive member, and a third coupling member operably interconnecting the first and second coupling members. The supplemental friction mechanism is operable to apply the supplemental frictional force to the first coupling member. The supplemental frictional force applied to the first coupling member generates a frictional torque in response to relative rotation between the first coupling member and the second coupling member.

In the electromechanical strut of the present disclosure, the supplemental friction mechanism includes a contact ring and a biasing member acting to bias the contact ring into constant engagement with the first coupling member and to apply the supplemental frictional force thereon. The contact ring is non-rotatable and is axially moveable with respect to the first coupling member, and the biasing member is at least one spring acting on the contact ring.

In the electromechanical strut of the present disclosure, the first coupling member is a sprag ring, wherein the second coupling member is a coupler ring, and the third coupling member is a resilient coupler establishing a first drive interface with the sprag ring and a second drive interface with the coupler ring so as to transfer torque between the sprag ring and the coupler ring. The supplemental friction mechanism includes the contact ring non-rotatably fixed for axial movement relative to the sprag ring and the spring urging the contact ring into engagement with the sprag ring for applying the supplemental frictional force thereto which functions to oppose rotation of the sprag ring relative to the contact ring.

In accordance with the aspects of the present disclosure, an electromechanical strut is provided for moving a lift gate between an open position and a closed position relative to a motor vehicle body. The electromechanical strut includes a housing operably connected to one of the a lift gate and the motor vehicle body and an extensible member that is slideably moveable relative to the housing and operably connected to the other one of the a lift gate and the motor vehicle body. The electromechanical strut further includes a motor-gearbox assembly mounted in the housing that is operable for converting rotation of a power screw into linear motion of the extensible member for moving the extensible member between a retracted position relative to the housing, which corresponds to the closed position of the lift gate, and an extended position relative to the housing, which corresponds to the open position of the lift gate. The motor-gearbox assembly includes an electric motor having a rotary output member, a gearbox having an input component driven by the rotary output member of the electric motor and an output component driven at a reduced speed relative to the input component, a flex coupling assembly establishing a first drive interface with the output component of the gearbox unit and a second drive interface with the power screw, and a supplemental friction mechanism for generating and applying a supplemental frictional load on the at least one of the flex coupling assembly and the power screw.

In accordance with further aspects of the present disclosure, an electromechanical strut for moving a pivotal closure member between an open position and a closed position relative to a motor vehicle body including the following is provided: a housing operably connected to one of the closure member and the motor vehicle body and an extensible member operably connected to the other one of the closure member and the motor vehicle body. The extensible member is provided being moveable axially in response to rotation of a drive member between an axially retracted position relative to the housing which corresponds to the closed position of the closure member and an axially extended position relative to the housing which corresponds to the open position of the closure member. The electromechanical strut has a motor-gearbox assembly including an electric motor having a rotary output member configured to drive an input component of a geartrain with an output component of the geartrain being driven at a reduced speed relative to the input component, wherein a coupling assembly operably couples the output component of the geartrain to the drive member. Further, a supplemental friction mechanism is disposed between the geartrain and the coupling assembly, wherein the supplemental friction mechanism includes a biasing member compressed axially between the geartrain and the coupling assembly to apply a supplemental frictional force to at least one of the geartrain and the coupling assembly, thereby facilitating the reduction of a backdrive scenario of the geartrain and motor, which in turn, facilitates maintaining the pivotal closure panel in the desired position.

These and other alternative embodiments are directed to providing an electromechanical strut for use in a powered closure system of a motor vehicle and having an electric motor, a reduction gearbox, a flex coupling assembly, and a supplemental friction mechanism integrated into a common assembly to provide enhanced operation in a compact arrangement.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the written description when considered in combination with the appended Figures, wherein.

DETAILED DESCRIPTION OF EXAMPLE EMBODIMENTS

Figure 1:
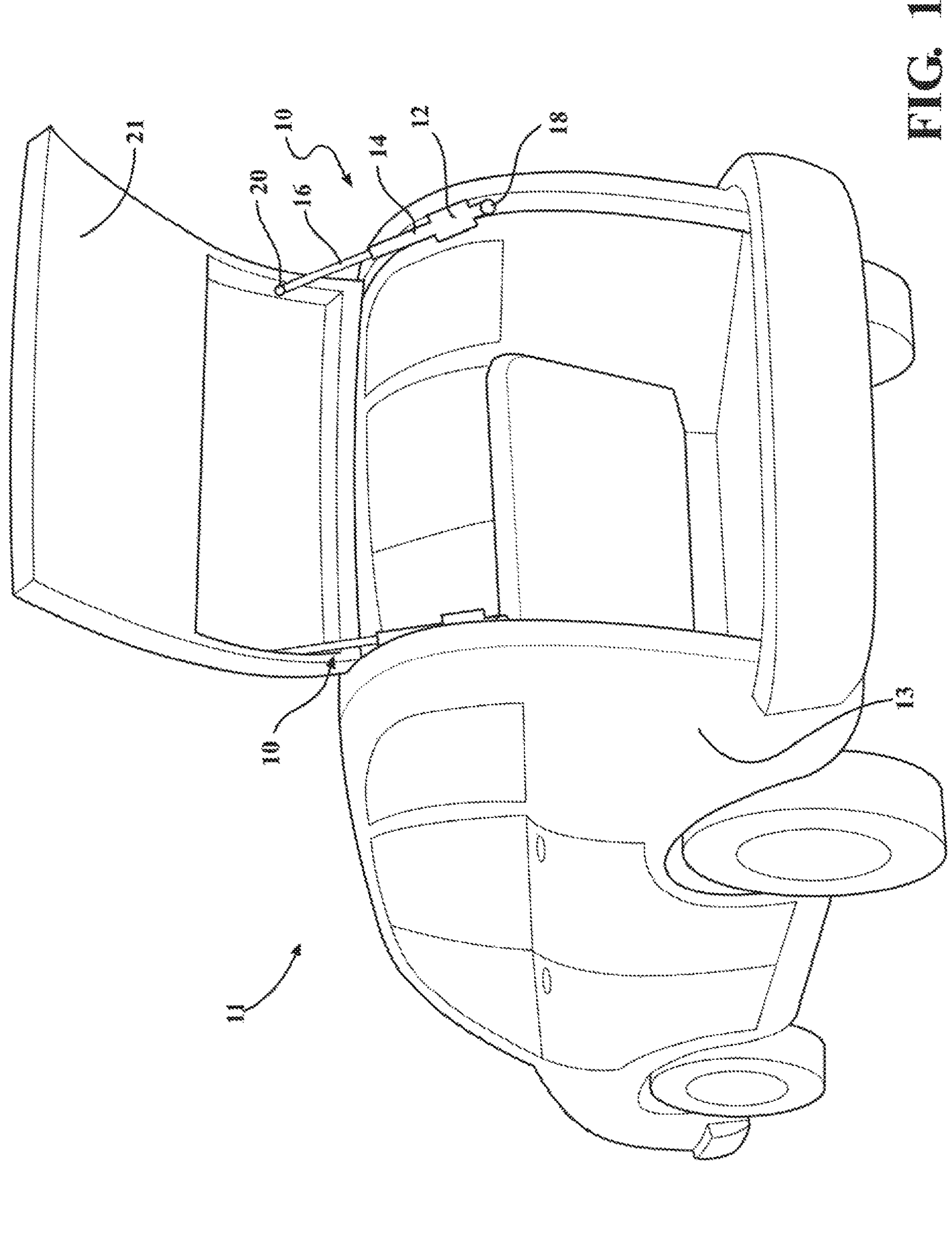
FIG. 1 is an isometric view of a motor vehicle having a powered lift gate system equipped with a pair of electromechanical struts at least one of which is constructed in accordance with the teachings of the present disclosure.

Vehicles, particularly passenger vehicles, are equipped with numerous moveable closure panels for providing openings and access within and through defined portions of the vehicle body. To enhance operator convenience, many vehicles are now equipped with power-operated closure systems to automatically control movement of all types of closure panels including, without limitation, hatch lift gates, trunk and hood deck lids, sliding and hinged doors, sun roofs and the like. The powered operation is often provided by an electromechanical drive device including, without limitation, motor-driven gear drives, cable drives, chain drives, belt drives and power screw drives. Current development focus is largely directed to improving these popular systems through weight and part count reduction, packaging efficiency, system noise, back drive effort, cost and ease of assembly and service repair. Accordingly, the present disclosure addresses all of these issues.

For purposes of descriptive clarity, the present disclosure is described herein in the context of one or more specific vehicular applications, namely powered lift gate and deck lid systems. However, upon reading the following detailed description in conjunction with the appended drawings, it will be clear that the inventive concepts of the present disclosure can be applied to numerous other systems and applications. In this regard, the present disclosure is generally directed to electromechanical struts equipped with a power drive unit and a telescoping unit. The power drive unit includes a motor-gearbox assembly having an electric motor and a dual-stage planetary geartrain driven by the electric motor. The telescoping unit includes a rotary-to-linear conversion assembly driven by the planetary geartrain of the motor-gearbox assembly. In addition, the present disclosure is also generally directed to installing a flex coupling between the motor-gearbox assembly and the rotary-to-linear conversion assembly. Specifically, the flex coupling is operatively coupled between a second stage gearset of the dual-planetary geartrain and a rotary power screw of the rotary-to-linear conversion assembly. Finally, the present disclosure is also directed to installing a spring-loaded supplemental friction mechanism between the second stage gearset of the dual-stage planetary geartrain and the flex coupling to provide enhanced stop and hold functionality to the rotary-to-linear conversion assembly.

Accordingly, the present disclosure is directed to integration of a supplemental friction mechanism into the drive interface between the rotary output of a planetary geartrain (associated with a power drive unit) and the rotary input of a rotary-to-linear conversion assembly (associated with a telescoping unit), together assembled for use in an electromechanical strut for power-operated movement of a vehicle closure member (i.e. liftgate, etc.). Integration of the supplemental friction mechanism is preferably associated with a "dead-space" between the rotary output of the planetary geartrain and a rotary power screw of a power-operated spindle drive mechanism. Such an orientation provides reduced overall axial length of the power drive unit as well as reduced component requirements and assembly complexity.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

Referring now to FIG. 1, a pair of electromechanical struts 10 are shown mounted to a motor vehicle 11. Each electromechanical strut 10 includes a lower housing 12, an upper housing 14, and an extensible member 16. A first pivot mount 18, located at an end of lower housing 12, is pivotally mounted to a portion of a vehicle body 13 that defines an interior cargo area in the vehicle 11. A second pivot mount 20, attached to the distal end of extensible member 16, is pivotally mounted to a closure member, such as a lift gate 21 of the vehicle, by way of example and without limitation.

Figures 2, 3:
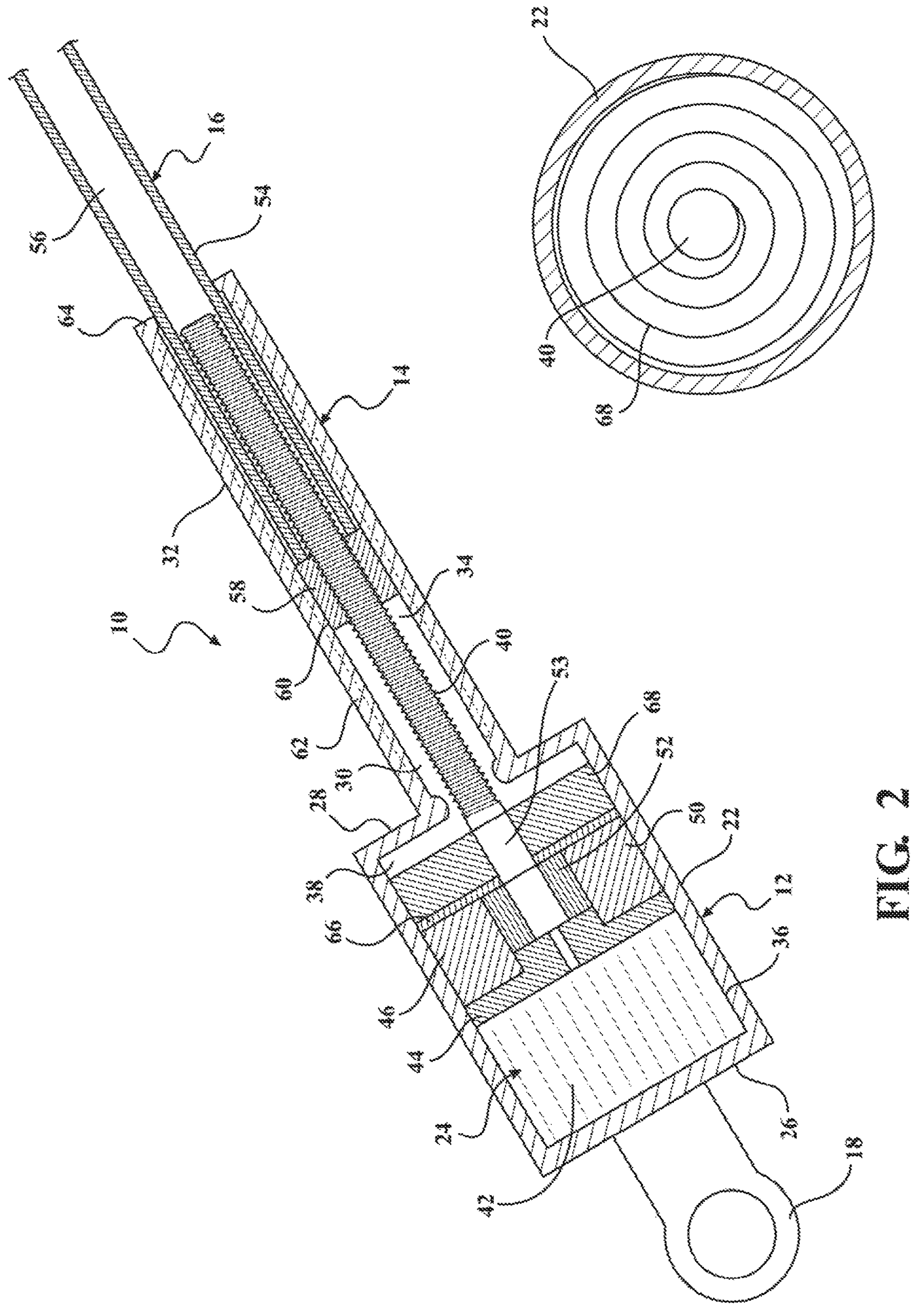
FIG. 2 is a sectional view of the electromechanical strut shown in an extended position.
FIG. 3 is a sectional view of a spring housing associated with the electromechanical strut shown in FIG. 2.

Referring now to FIG. 2, the interior of lower housing 12 is shown in greater detail. Lower housing 12 provides a cylindrical sidewall 22 defining a chamber 24. Pivot mount 18 is attached to an end wall 26 of lower housing 12 proximal to the vehicle body 13. Upper housing 14 provides a cylindrical sidewall 32 defining a chamber 34 that is open at both ends. A distal end wall 28 of lower housing 12 includes an aperture 30 so that chamber 24 and chamber 34 communicate with each other. Upper housing 14 has a smaller diameter than lower housing 12. However, it is contemplated that lower housing 12 and upper housing 14 can also be formed as a single cylinder or frusto-cone. Upper housing 14 can be integrally formed with lower housing 12, or it can be secured to lower housing 12 through conventional means (threaded couplings, weld joints, etc.). A motor-gearbox assembly 36 is disposed within chamber 24.

Motor-gearbox assembly 36 includes an electric motor 42, a slip clutch 44, and a geared reduction gearset 46 operable for driving a rotary drive member, such as a power screw 40 associated with a spindle-type drive mechanism. Motor 42 is mounted within chamber 24 near end wall 26. Motor 42 is secured to at least one of cylindrical sidewall 54 and end wall 26 to prevent undesired vibrations or rotation. Motor 42 may be a direct current bi-directional motor. Electrical power and directional control for motor 42 is provided via electrical cables that connect from the vehicle body through apertures (not shown) in end wall 26. Clutch 44 is connected to an output shaft of motor 42. Clutch 44 provides a selective engagement between the output shaft of motor 42 and a rotary input component of reduction gearset 46. Clutch 44 may be an electromechanical clutch that engages reduction gearset 46 when motor 42 is activated. When clutch 44 is engaged, torque is transferred from motor 42 to reduction gearset 46. When clutch 44 is disengaged, torque is not transferred between motor 42 and reduction gearset 46 so that no back drive occurs if, for example, lift gate 21 is closed manually. Clutch 44 may also be a passive torque-limiting friction clutch configured to disconnect motor 42 from reduction gearset 46 when manual operation of lift gate 21 occurs. As an optional arrangement, clutch 44 could be operably disposed between an output component of gearset 46 and power screw 40.

Reduction gearset 46 provides speed reduction and torque multiplication for power screw 40. Reduction gearset 46 is configured as a planetary geartrain, also referred to as planetary gearset, having a ring gear 50 driven by the output of clutch 44. In turn, a number of planet gears 52 transfer power from ring gear 50 to power screw 40 via a rotary output member, such as an output gear 51, which is centrally disposed within planetary gearset 46, for providing the desired gear ratio reduction to power screw 40. Output gear 51 acts as a sun gear in planetary gearset 46. Power screw 40 extends into upper housing 14. A coupling assembly, also referred to as coupling unit 53, interconnects output gear 51 of planetary gearset 46 to an input segment of power screw 40. Coupling unit 53 may provide for and accommodate misalignment between output gear 51 and power screw 40 while providing a damping feature to minimize shock loading. Coupling unit 53 and slip clutch 44 may be integrated into a common assembly to provide enhanced functionality and improved packaging efficiency.

Extensible member 16 has a cylindrical sidewall 54 defining a chamber 56 and is concentrically mounted between upper housing 14 and power screw 40. As described earlier, second pivot mount 20 is attached to the distal end of extensible member 16. The proximal end of extensible member 16 is open. A drive nut 58, also associated with the spindle-type drive mechanism, is mounted around the proximal end of extensible member 16 relative to lower housing 12 and is threadedly coupled with power screw 40 in order to convert the rotational movement of power screw 40 into the linear motion of extensible member 16 along the axis of power screw 40. The combination of threaded power screw 40 and threaded drive nut 58 defines the rotary-to-linear conversion device and, more particularly, the threaded spindle-type drive assembly. More specifically, internal threads formed in drive nut 58 are in threaded engagement with external threads formed on power screw 40. Drive nut 58 includes at least two external lugs 60 that extend into opposing coaxial slots 62 formed on the inside of upper housing 14 to prevent drive nut 58 from rotating. The length of slots 62 defines the retracted and the extended positions of extensible member 16. Alternatively, a spindle drive assembly could be used in electromechanical strut 10 having an internally-threaded drive nut 58 driven by the output of planetary gearset 46 and threadedly meshed with an externally-threaded power screw 40 connected to extensible member 16. As a further alternative, a ballscrew drive assembly could be used in lieu of the spindle drive assembly without departing from the scope of the invention. An integrally-formed outer lip 64 in upper housing 14 provides an environmental seal between chamber 34 and the outside.

A spring housing 38 is provided in lower housing 12 and is defined by cylindrical sidewall 22, end wall 28, and a flange 66. Within spring housing 38, a power spring 68 is coiled around power screw 40, providing a mechanical counterbalance to the weight of lift gate 21. Preferably formed from a strip of steel, power spring 68 assists in raising lift gate 21 both in its powered and un-powered modes. One end of power spring 68 is attached to power screw 40 and the other is secured to a portion of cylindrical sidewall 22. When extensible member 16 is in its retracted position, power spring 68 is tightly coiled around power screw 40. As power screw 40 rotates to extend extensible member 16, power spring 68 uncoils, releasing its stored energy and transmitting an axial force through extensible member 16 to help raise lift gate 21. When power screw 40 subsequently rotates to retract extensible member 16, power spring 68 recharges by recoiling around power screw 40.

Power spring 68 stores sufficient energy when coiled to drive power screw 40 to fully raise lift gate 21, even when motor-gear assembly 36 is not engaged (typically by unlatching lift gate 21 to raise it manually.) In addition to assisting to drive power screw 40, power spring 68 provides a preloading force that reduces starting resistance and wear for motor 42. Furthermore, power spring 68 provides dampening assistance when lift gate 21 is closed. Unlike a gas strut, power spring 68 is generally not affected by temperature variations, nor does it unduly resist manual efforts to close lift gate 21. Although the present embodiment describes power spring 68 that uncoils to assist in raising lift gate 21 and recoils to lower lift gate 21, it has been contemplated that a power spring 68 could be provided that uncoils when lowering the lift gate and recoils when raising the lift gate.

Figure 4:
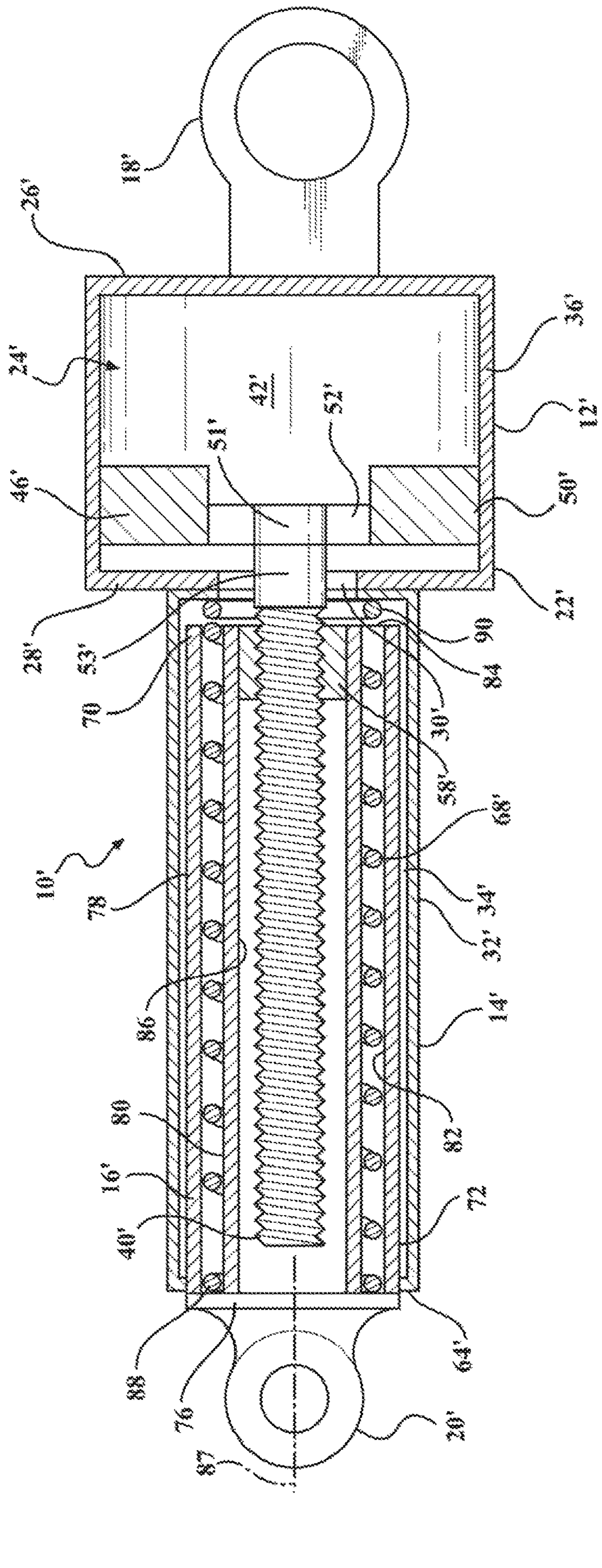
FIG. 4 is a sectional view of another electromechanical strut shown in a retracted position.
Figure 5:
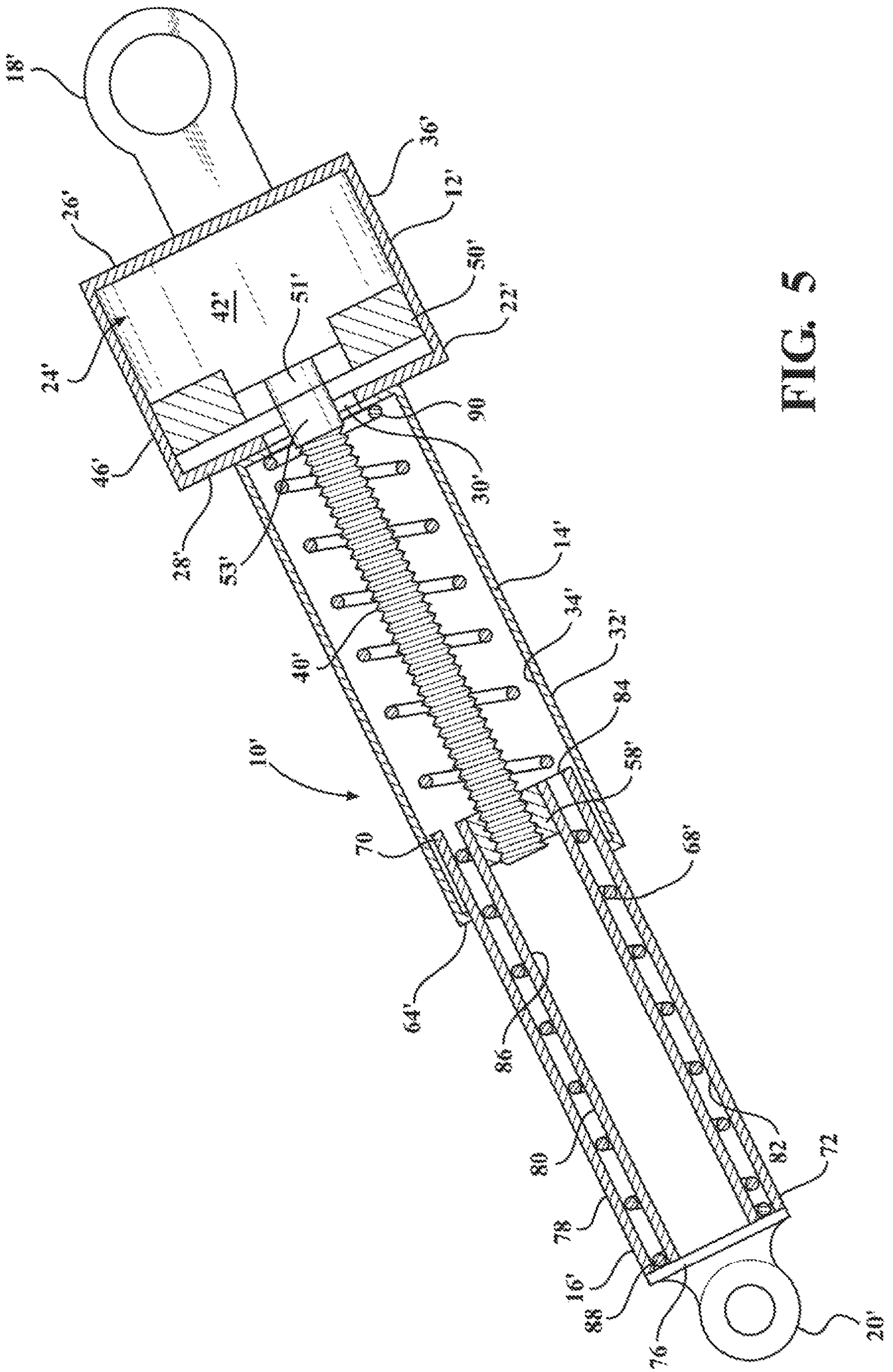
FIG. 5 is a sectional view of the electromechanical strut of FIG. 4 shown in an extended position.

Referring to FIGS. 4 and 5, wherein primed reference numerals represent similar elements as those set forth above, an electromechanical strut 10' is shown to include a lower housing 12' having a cylindrical sidewall 22' defining a chamber 24', and an upper housing 14' having cylindrical a sidewall 32' defining a chamber 34'. It is appreciated that lower 12' and upper 14' housings may be formed as a single housing. Electromechanical strut 10' also includes an extensible member 16' movable between a retracted position, shown in FIG. 4, corresponding to a closed position of lift gate 21 and an extended position, shown in FIG. 5, corresponding to an open position of lift gate 21.

Motor-gearbox assembly 36' is disposed within chamber 24'. Motor-gearbox assembly 36' includes electric motor unit 42' and a planetary geartrain, also referred to as geared reduction gearset unit 46' for driving power screw 40'. Geared reduction unit 46' is a planetary gearset having planet gears 52' that transfer power from a ring gear 50' to a rotary output member, such as a central output gear 51' for rotatably driving power screw 40' via a coupling assembly, also referred to as coupling unit 53'. In this arrangement, coupling unit 53' may act as an integrated flex coupling and slip clutch device, as will be detailed hereinafter.

Extensible member 16' extends between opposing first 70 and second 72 ends. First end 70 of extensible member 16' is open and second end 72 of extensible member 16' is closed off by an end wall 76. Second end 72 of extensible member 16' is connected to pivot mount 20'. Extensible member 16' includes an outer cylindrical wall 78 and an inner cylindrical wall 80 spaced apart inwardly from outer cylindrical wall 78. One end of inner cylindrical wall 80 is connected to end wall 76. Outer cylindrical wall 78 and inner cylindrical wall 80 define a toroidal chamber 82 therebetween. One end of toroidal chamber 82 is closed off by end wall 76 and an opposing end of toroidal chamber 82 defines an opening 84. Inner cylindrical wall 80 further defines a cylindrical chamber 86 inward of toroidal chamber 82. Cylindrical chamber 86 is separated from toroidal chamber 82 by inner cylindrical wall 80.

Drive nut 58' is rigidly mounted in cylindrical chamber 86 of extensible member 16'. Drive nut 58' is threadedly coupled with power screw 40' in order to convert the rotational movement of power screw 40' into linear motion of extensible member 16' along a longitudinal axis 87 of power screw 40'. Power screw 40' and drive nut 58' define a threaded spindle drive assembly. Power spring 68' is seated within toroidal chamber 82. Power spring 68' includes one end 88 engaging to second end 72 of extensible member 16', and another end 90 engaging to upper housing 14' adjacent lower housing 12'. Power spring 68' is a coil spring that uncoils and recoils as extensible member 16' moves relative to upper 14' and lower 12' housings. It is, however, appreciated that the particular type of spring may vary.

In powered operation, torque provided by motor 42' is transferred via planetary gearset 46' to power screw 40' for causing linear motion of extensible member 16', as described above. For manual operation, motor 42' and planetary gearset 46' can be back driven and/or coupling 53' can releasably disconnect power screw 40' from gearset 46'. The friction in the system due to the direct engagement of motor 42' and planetary gearset 46' with power screw 40' allows lift gate 21 to remain still in any intermediate position between the open and closed positions. Electromechanical strut 10' thus provides stable intermediate positions for the lift gate (useful, for example, for garages with low ceilings) without power consumption by using the internal friction of motor-gearbox assembly 36'.

Power spring 68' provides a mechanical counterbalance to the weight of lift gate 21. Power spring 68', which may be a coil spring, assists in raising lift gate 21 both in its powered and un-powered modes. When extensible member 16 is in the retracted position, power spring 68' is tightly compressed between extensible member 16' and lower housing 12'. As power screw 40' rotates to extend member 16', power spring 68' extends as well for releasing its stored energy and transmitting an axial force through member 16' to help raise lift gate 21. When power screw 40' rotates to retract extensible member 16', or when lift gate 21 is manually closed, power spring 68' is compressed between member 16' and lower housing 12' and thus recharges.

In addition to assisting in driving power screw 40', power spring 68' also provides a preloading force for reducing starting resistance and wear of motor 42'. Furthermore, power spring 68' provides dampening assistance when the lift gate 21 is closed. Unlike a gas strut, power spring 68' is generally not affected by temperature variations, nor does it unduly resist manual efforts to close the lift gate 21.

Figure 6:
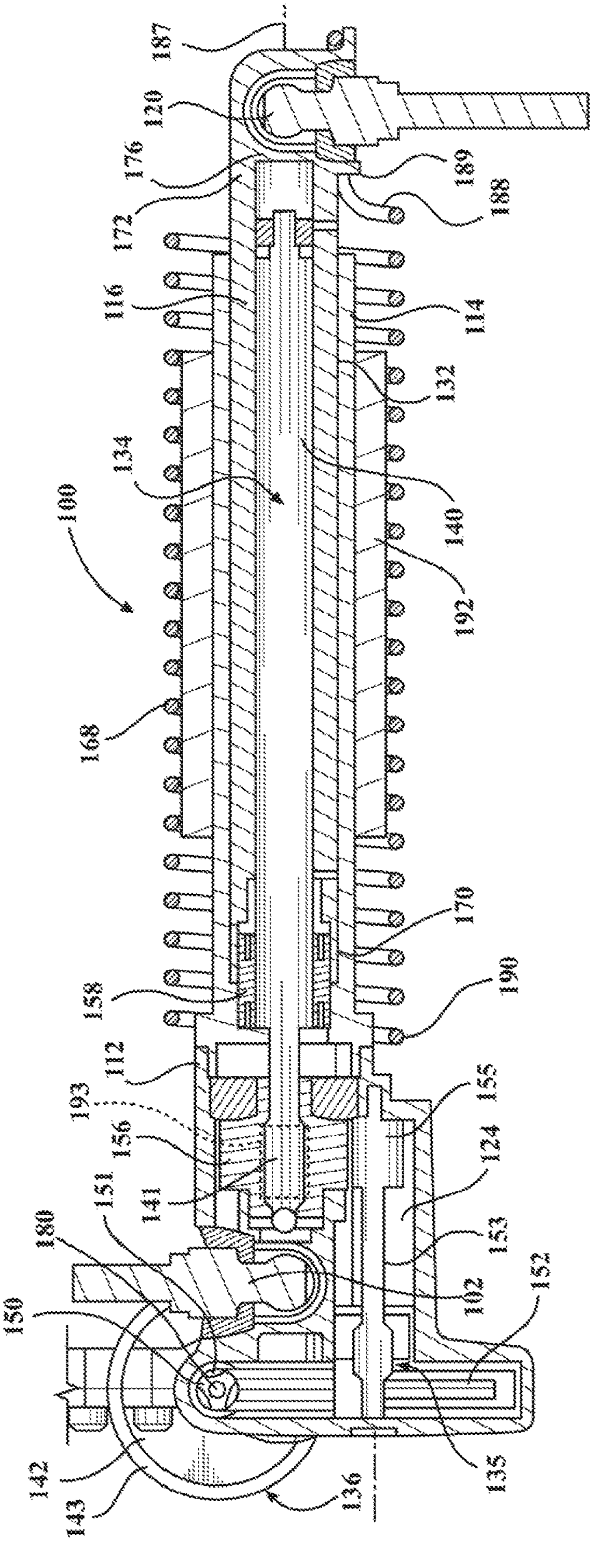
FIG. 6 is a sectional view of another electromechanical strut shown in a retracted position.
Figure 7A:
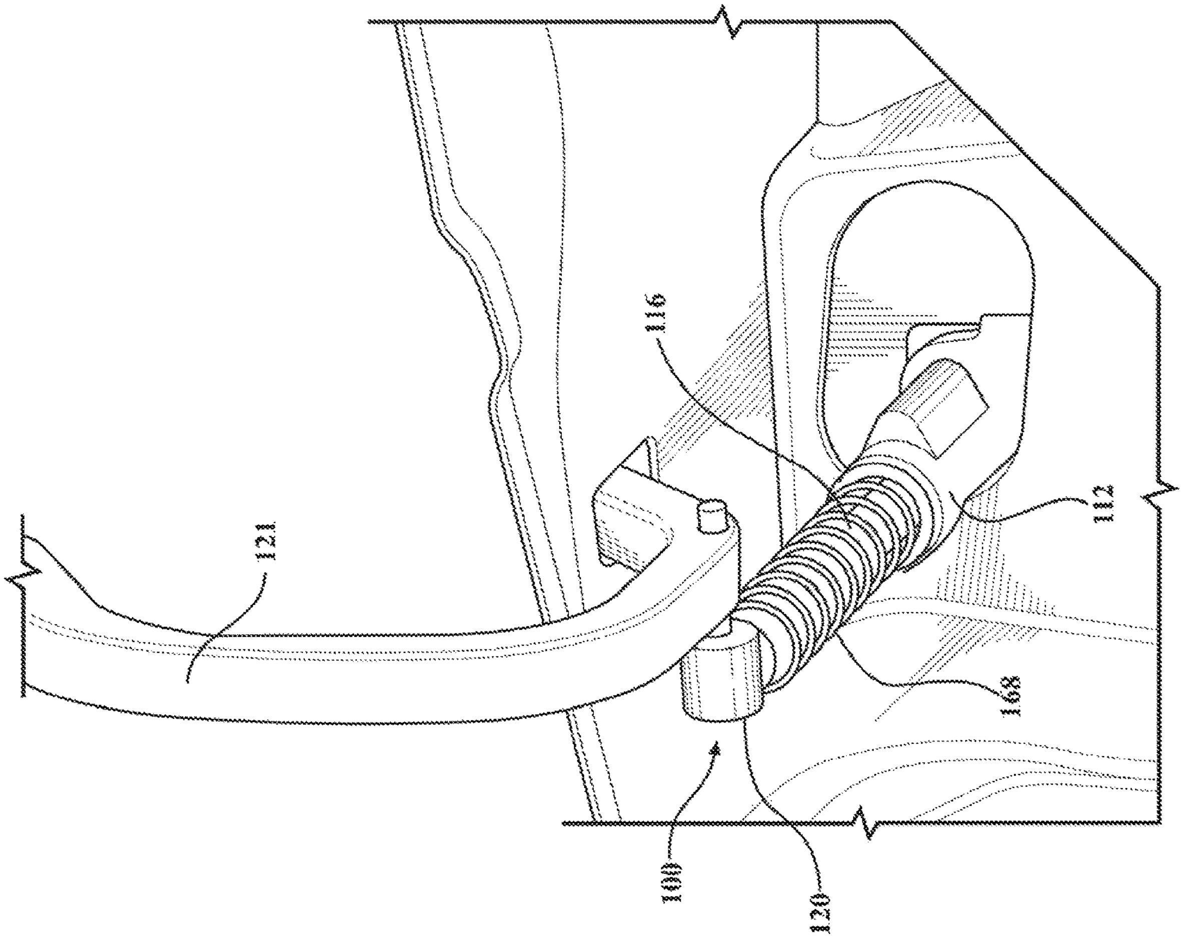
FIGS. 7A and 7B are isometric views of the electromechanical strut from FIG. 6 shown in different mounting positions for pivoting a vehicle trunk lid.

FIG. 6 shows an electromechanical strut 100 which is particularly suited for smaller closure members, including panels such as a trunk deck lid as opposed to larger closure panels such as lift gates, because electromechanical strut 100 has a shorter overall length as compared to the previously discussed embodiments. Electromechanical strut 100 includes a lower housing 112 defining a gearbox housing 124, and an upper housing 114 having a cylindrical sidewall 132 defining a chamber 134. A mount 102 is connected to lower housing 112. The lower 112 and upper 114 housings may be formed as a single housing. Electromechanical strut 100 also includes an extensible member 116 movable between a retracted position, shown in FIG. 6 corresponding to a closed position of the deck lid, and an extended position, shown in FIG. 7A corresponding to an open position of the deck lid.

A motor-gearbox assembly 135, including a motor unit 142 and a geared reduction unit 136, drives a power screw 140 which, in turn, drives extensible member 116 as is discussed in greater detail below. In this particular embodiment, motor 142 is an electric motor mounted in a housing 143 while geared reduction unit 136 is a two-stage geartrain 136. More particularly, motor 142 features an output shaft 150 with a rotary output member, such as a worm 151 fixedly mounted thereon that extends into gearbox housing 124. Worm 151 drivingly engages a worm gear 152 mounted in gearbox housing 124. Worm 151 and worm gear 152 define a worm gearset. Worm gear 152, in turn, includes an integral or rigidly mounted shaft 153 extending transversely from worm gear 152 along its rotational axis, thus providing a first stage speed reduction and torque multiplication. Shaft 153 is journalled in gearbox housing 124 and features a pinion gear 155 that drivingly engages a drive gear 156, thus providing a second stage of speed reduction and torque multiplication. In the present embodiment, two-stage geartrain 136 provides about a 38:1 gear ratio reduction, although this ratio will vary depending on the specific geometry of any particular application. Power screw 140 has a non-threaded butt portion 141 that extends into and is fixedly connected in a central aperture of drive gear 156, thus transferring rotary power from motor 142 to power screw 140. In the foregoing manner, motor 142 may be mounted with its longitudinal axis 180 which is centered along motor output shaft/worm 150, 152, transverse to a longitudinal axis 187 of upper housing 114, which is centered along power screw 140. Hence, the overall length of the electromechanical strut 100 may be reduced compared to the previously described embodiments 10, 10' of the strut.

Extensible member 116 extends between opposing first 170 and second 172 ends. First end 170 of extensible member 116 is open and second end 172 of extensible member 116 is closed off by an end wall 176. Second end 172 of extensible member 116 is connected to a mount 120. A drive nut 158 is rigidly mounted in extensible member 116 at first end 170 thereof. Drive nut 158 is threadedly coupled to power screw 140 in order to convert the rotational movement of power screw 140 into linear motion of the extensible member 116 along longitudinal axis 187 of power screw 140. Thus, power screw 140 and drive nut 158 define a threaded spindle drive assembly.

In the present embodiment, a power spring 168 is fitted over cylindrical sidewall 132. A first end 188 of spring 168 abuts or is otherwise connected to a lip 189 proximate second end 172 of extensible member 116. A second end 190 of spring 168 abuts or is otherwise connected to upper housing 114 adjacent lower housing 112. The spring 168 is a coil spring that uncoils and recoils as the extensible member 116 moves relative to upper 114 and lower 112 housings. In the mounting position shown in FIG. 7A, spring 168 is in compression and is biased to urge extensible member 116 toward the extended position corresponding to the open position of the deck lid. In this embodiment, mount 120 is connected to a goose neck hinge 121 that pivots the deck lid (not shown) and mount 102 is connected to the vehicle body. A foam dampener 192 (FIG. 6) is concentrically installed between the coils of spring 168 and cylindrical sidewall 132 to inhibit collapse of the coils and the minimize gear noise.

In powered operation, torque provided by electric motor 142 is transferred via two-stage planetary geartrain 136 to power screw 140 for causing linear motion of extensible member 116 as described above. For manual operation, because there is no clutch, the motor 142 and geartrain 136 must be back driven. As an alternative to the direct connection between drive gear 156 and butt portion 141 of power screw 140, a coupling unit 193, shown in phantom in FIG. 6, can be installed therebetween to provide at least one of a torque-limiting (i.e. slip clutch) function and a torsional/axial damping (i.e. flex damper) function. In this regard, various embodiments of such an integrated coupling unit will be described hereinafter.

Power spring 168 provides a mechanical counterbalance to the weight of the deck lid. Spring 168, which may be a coil spring, assists in raising the deck lid both in its powered and un-powered modes. When extensible member 116 is in the retracted position, power spring 168 is tightly compressed between extensible member 116 and lower housing 112. As power screw 140 rotates to extend member 116, power spring 168 extends as well, releasing its stored energy and transmitting an axial force through member 116 to help raise the deck lid. When power screw 140 rotates to retract extensible member 116, or when the deck lid is manually closed, power spring 168 is compressed between member 116 and lower housing 112 and thus recharges.

Figure 7B:
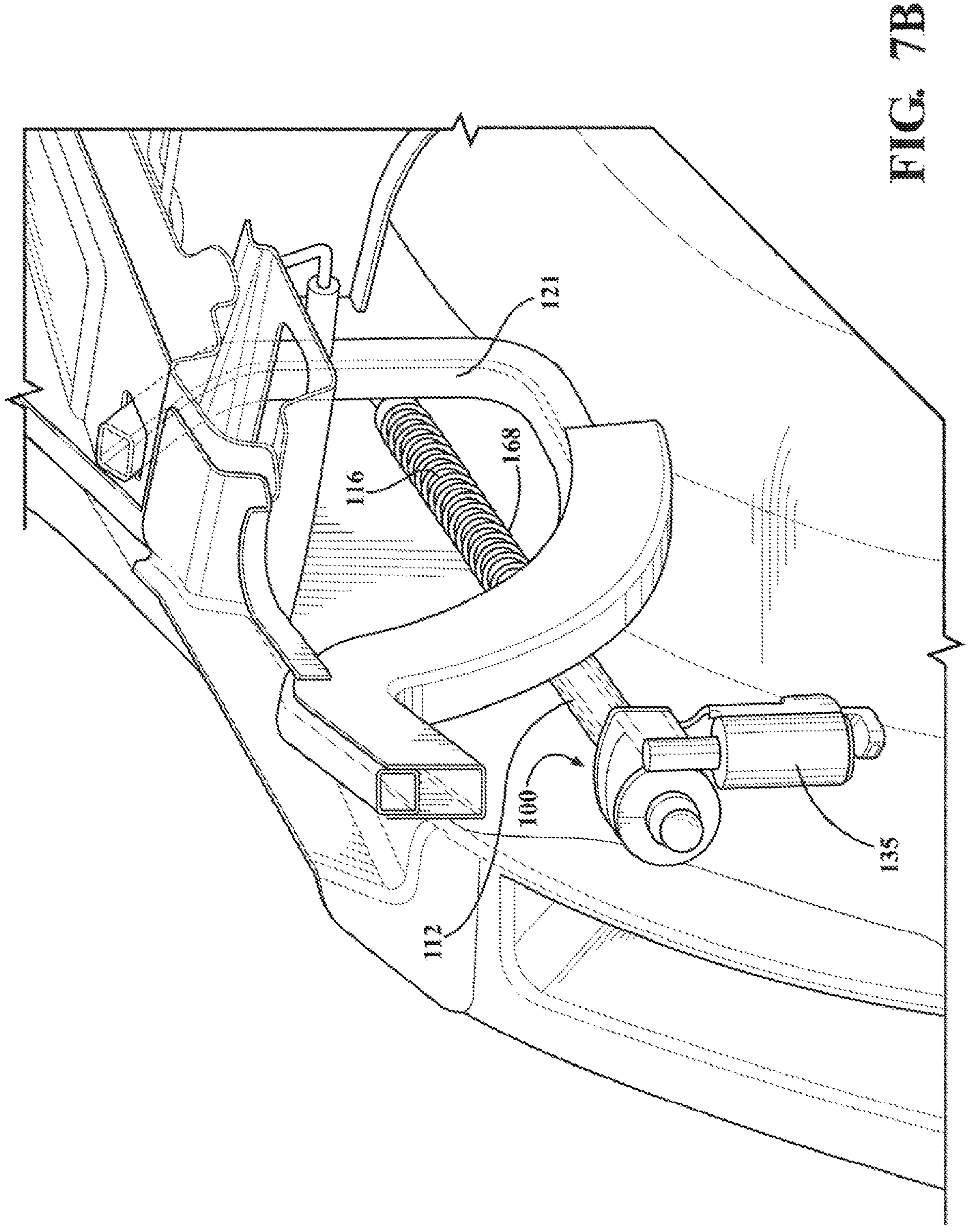

In FIG. 7B, spring 168 is in compression and is biased to urge extensible member 116 toward the extended position corresponding to the open position of the deck lid. In the mounting position shown in FIG. 7B, extensible member 116 is in its fully extended position when the deck lid is closed and extensible member 116 transitions to its fully retracted position when the deck lid is opened. In this mounting position, spring 168 is in tension and is biased to urge extensible member 116 toward the retracted position corresponding to the open position of the deck lid.

Figures 8, 8I:
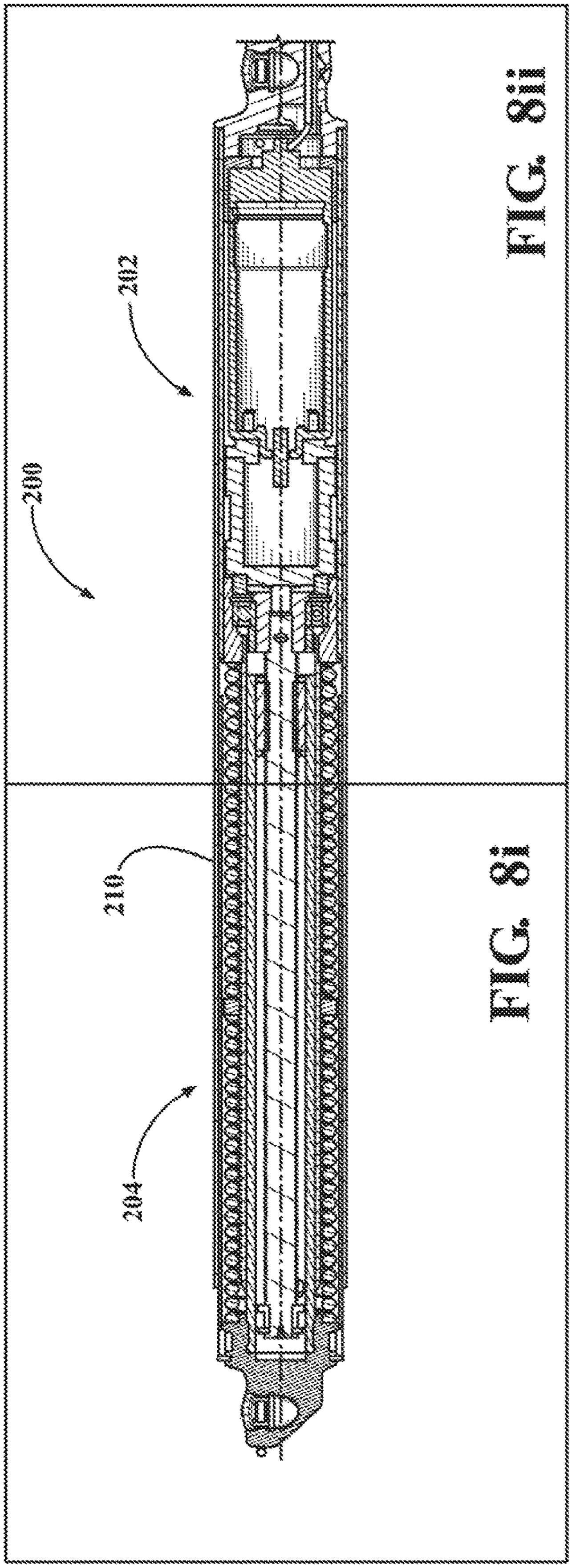
FIGS. 8, **8*i* and 8*ii*** are sectional views of yet another electromechanical strut shown in a retracted position.
Figure 8I:
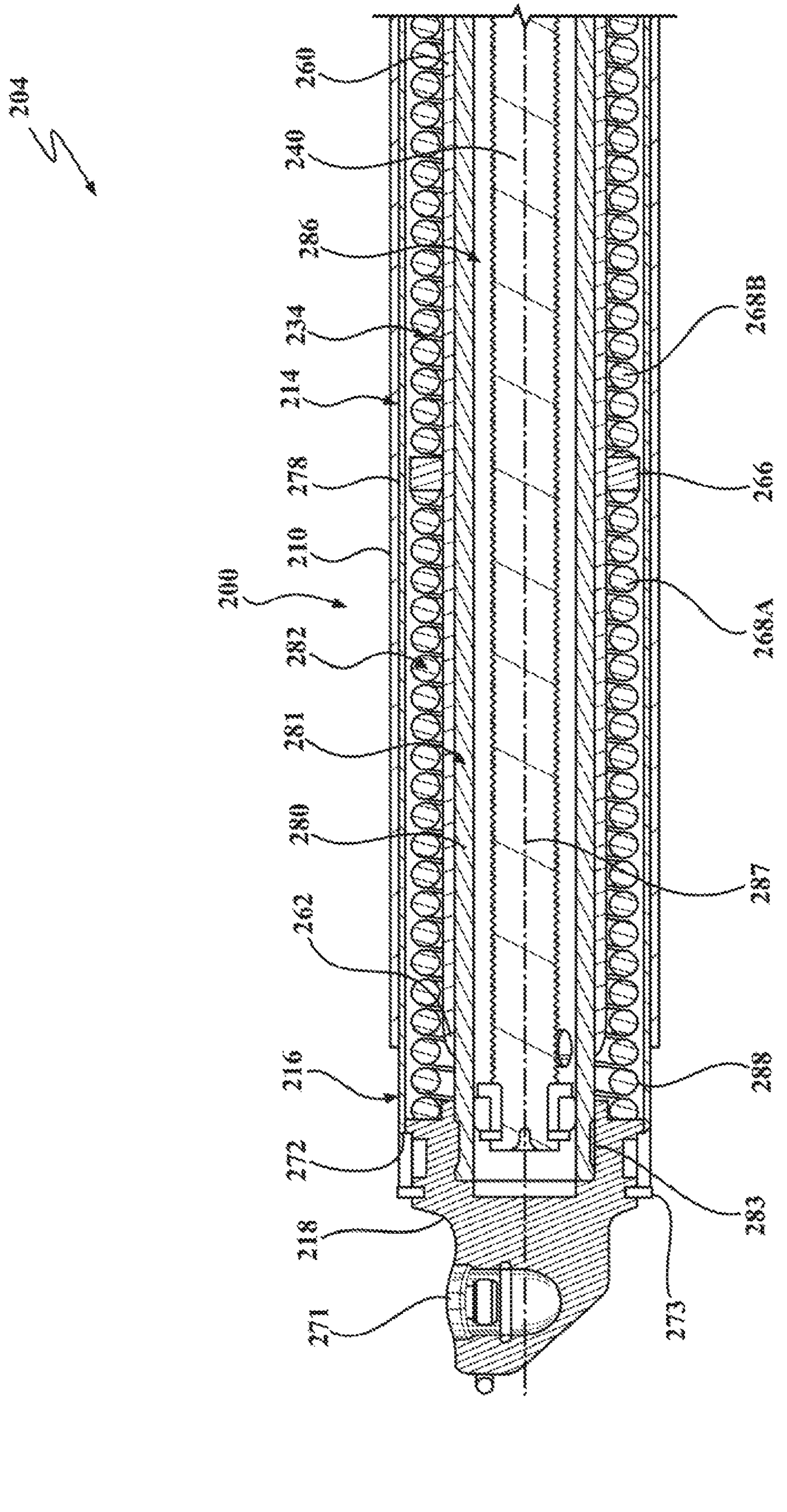
Figure 8I:
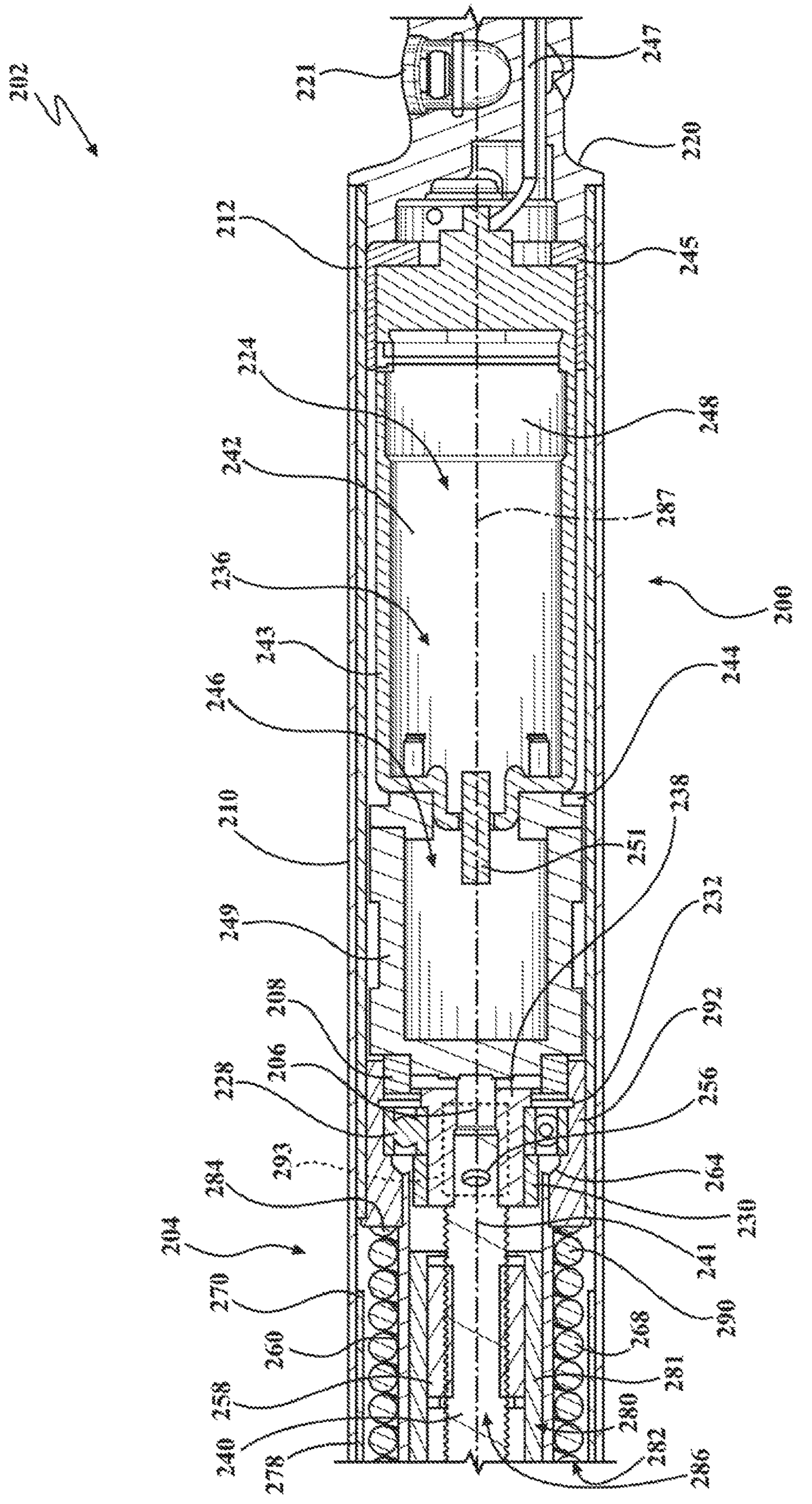
Figure 9:
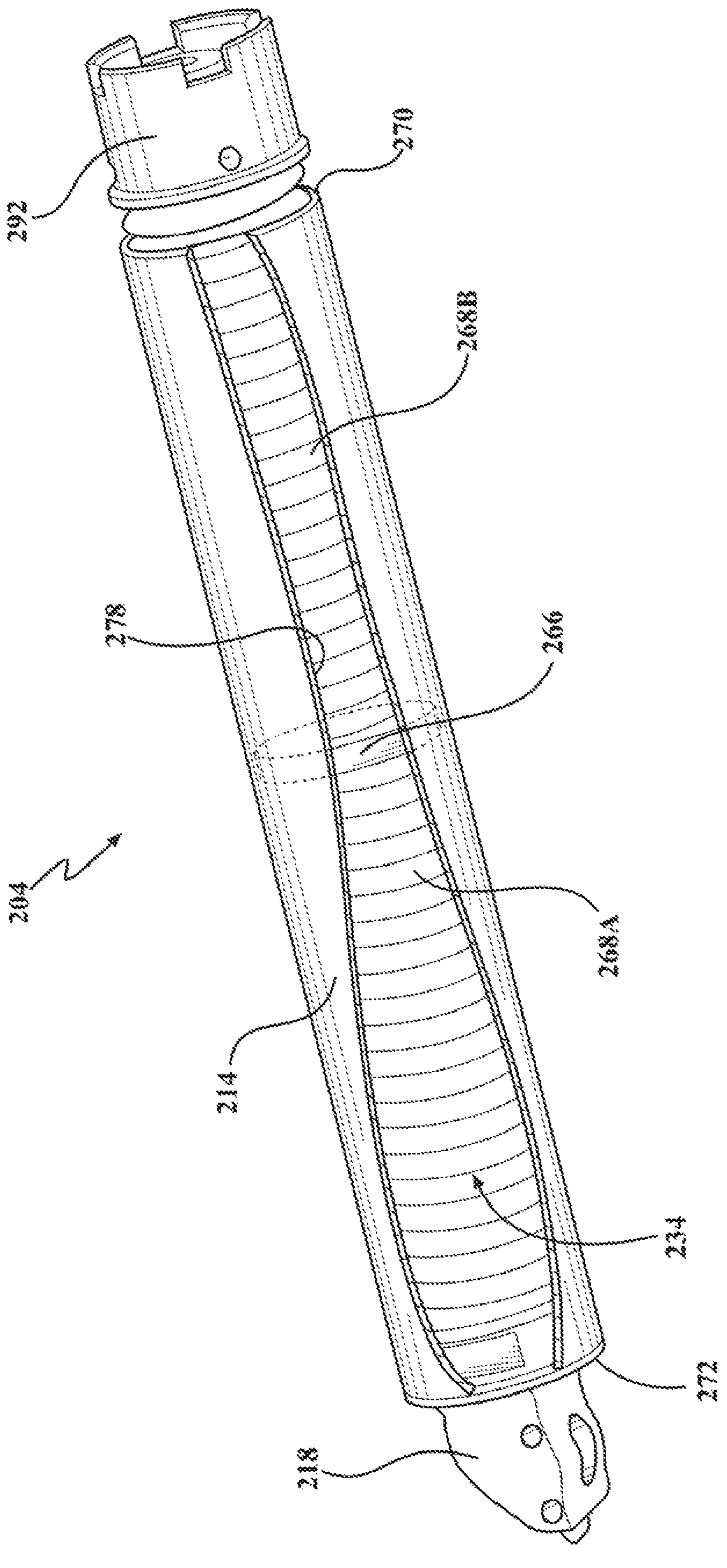
FIG. 9 is an isometric view of a telescoping unit associated with the electromechanical strut of FIG. 8, with its outer casing removed for additional clarity.

FIGS. 8, 8*i*, and 8*ii* show a cross-sectional view of an electromechanical strut 200 that has a more modular design than the previously discussed struts 10, 10'. Electromechanical strut 200 comprises two main, separable, units: a power drive unit 202 and a telescoping unit 204, which are shown in isolation in the fragmentary isometric views of FIG. 9 and FIG. 10 (with covering walls removed). Power drive unit 202 is sized and rated to function as a drive unit for a variety of closure panels associated with different vehicles. Telescoping unit 204 may be sized as required for each unique vehicle model to achieve a desired telescoping travel length. Power drive unit 202 features an output drive shaft 206 and an elastomeric coupling assembly, also referred to as coupling 208 that enable power unit 202 to be quickly and easily attached with telescoping unit 204 as discussed in greater detail below. As seen in FIGS. 8*i* and 8*ii*, an elongate tubular cover 210 preferably manufactured from plastic is fitted over the power and telescoping units 202, 204 to cover the joint between the two units from the environment. Cover 210 also provides an aesthetically pleasing uniform appearance of the strut to the observer.

As best shown in FIG. 8*ii*, power unit 202 has a tubular casing 212 fixed to an end cap 220 to define a chamber 224. The end cap includes a first pivot mount 221. Motor-gearbox assembly 236 is seated within chamber 224. Motor-gearbox assembly 236 generally includes an electric motor 242 and a planetary reduction gearset 246 operable to rotatably drive a power screw (drive member) 240. Motor 242 includes a motor housing 243 and holder cap 245 installed within chamber 224. An electrical connection between motor 242 and a remote controller (not shown) is illustrated via wire 247. Reduction gearset 246 is disposed within a gearbox housing 249 which, in turn, is installed within chamber 224. A rotary output member, such as a coupling member 251, is shown for drivingly coupling a rotary output of motor 242 to a rotary input of reduction gearset 246. Power screw 240 is seated in telescoping unit 204 and is coupled to power unit output shaft 206, as discussed in greater detail below. In the illustrated embodiment, planetary reduction gearset 246, which is known in the art per se, provides about a 20:1 gear ratio reduction.

As best shown in FIG. 8*i*, telescoping unit 204 has an extensible member 216 which comprises an outer guide tube or tubular casing 214 and a tubular nut-shaft 281, which are rigidly fixed to one another via an end cap 218. Extensible member 216 is movable between a retracted position, shown in FIG. 8 corresponding to a closed position of lift gate 21, and an extended position, not shown corresponding to an open position of the lift gate 21. Outer tubular casing 214 includes a cylindrical wall 278 that extends between opposing first 270 and second 272 ends and defines a chamber 234. First end 270 of cylindrical wall 278 is open and the second end 272 of cylindrical wall 278 is closed off by end cap 218. Preferably, second end 272 of cylindrical wall 278 is secured to end cap 218 via a snap ring 273. End cap 218 includes a second pivot mount 271.

Figure 11:
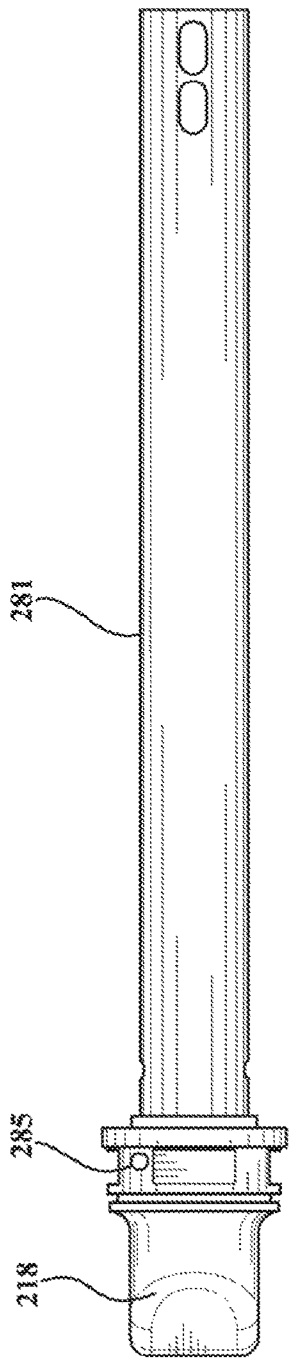
FIG. 11 is an isolated side view of a tubular nut-shaft utilized in the telescoping unit of the electromechanical strut shown in FIG. 8.

Tubular nut-shaft 281 features a cylindrical wall 280 spaced apart inwardly from cylindrical wall 278 of outer tubular casing 214. One end of cylindrical wall 280 is rigidly connected to end cap 218. Cylindrical wall 278 of outer tubular casing 214 and cylindrical wall 280 of tubular nut-shaft 281 define a toroidal chamber 282 therebetween. One end of toroidal chamber 282 is closed off by end cap 218 and an opposing end of toroidal chamber 282 defines an opening 284. Cylindrical wall 280 of tubular nut-shaft 281 further defines a cylindrical chamber 286 inward of toroidal chamber 282. Cylindrical chamber 286 is separated from toroidal chamber 282 by cylindrical wall 280. Cylindrical wall 280 of tubular nut-shaft 281 and end cap 218 have mating helical threads 283 for interconnecting these parts. As seen best in the isolated view of FIG. 11, to prevent the loosening or unscrewing of tubular nut-shaft 281 from end cap 218, a pin (not shown) is installed along a through hole 285 in end cap 218 that is aligned with cylindrical wall 280. In this manner the pin does not unduly pierce the cylindrical chamber 286, enabling the full volume of cylindrical chamber 286 to be used.

A drive nut 258 (FIG. 8*ii*) is rigidly mounted in cylindrical chamber 286 of tubular nut-shaft 281 proximate opening 284 thereof. In the preferred embodiment, drive nut 258 is riveted into cylindrical wall 280. Drive nut 258 is threadedly coupled with power screw 240 in order to convert the rotational movement of power screw 240 into linear motion of extensible member 216 along a longitudinal axis 287 of power screw 240.

Telescoping unit 204 includes an elongated, stationary inner guide tube 260 having an open end 262 distal to power unit 202 and an opposing end 264 proximate to and fixedly connected to power unit 202. Stationary guide tube 260 can be considered to form part of the housing connecting one end of the strut to the lift gate (or vehicle body), with the extensible member 216 connecting the other end of the strut the vehicle body (or lift gate). Stationary inner guide tube 260 is disposed in toroidal chamber 282 immediately adjacent to cylindrical wall 280 of tubular nut-shaft 281 and spaced apart inwardly from cylindrical wall 278 of outer guide tube/tubular casing 214. Stationary inner guide tube 260 fits closely over tubular nut-shaft 281 but does not extend or translate linearly with the extensible member 216.

A power spring 268 is seated within toroidal chamber 282, between stationary inner guide tube 260 and cylindrical wall 278 of outer guide tube/tubular casing 214. Power spring 268 is a coil spring that uncoils and recoils as extensible member 216 moves relative to stationary tube 260 and power unit 202. The annular spacing between stationary inner guide tube 260 and outer guide tube/tubular casing 214 is sized to closely fit the preferred toroidal form of power spring 268. One end 288 of spring 268 is connected to end cap 218 of extensible member 216 and another end 290 of spring 268 is connected to end 264 of stationary inner guide tube 260 proximate to, and ultimately supported by, power unit 202. It should be appreciated that in the present embodiment, power spring 268 is guided and supported against buckling along its entire length of travel by the combined action of stationary inner guide tube 260 which guides the inside edge of power spring 268, and outer guide tube/tubular casing 214 which guides the outer edge of power spring 268. In the preferred embodiment, when extensible member 216 is at its fully extended position, stationary inner guide tube 260 and outer guide tube/tubular casing 214 overlap or are co-extensive thus inhibiting the tendency of power spring 268 to buckle.

Power spring 268 may be composed of first and second coil segments 268A, 268B that are serially arranged in toroidal chamber 282. The first coil segment is wound a first direction, and the second coil segment is wound in the opposite direction. A thrust bearing, such as washer 266, is interposed between the first and second coil segments 268A, 268B. This arrangement is advantageous because it balances torsional loads that coil segments 268A, 268B encounter as extensible member 216 translates. In contrast, when only one spring is present, as the extensible member moves a torsional force develops at the ends of the spring that will typically cause the spring to rotate, resulting in a high frictional force due to the contact between the many coils in the spring and the outer and inner guide tubes 214, 260. Thus, the preferred embodiment decreases the friction between power spring 268 and outer and inner guide tubes 214, 260, increasing the efficiency of the system and reducing manual opening and closing efforts of the lift gate. It should be appreciated, however, that the particular type of spring may vary.

Telescoping unit 204 mounts on the power unit 202 as follows: Referring additionally to the fragmentary exploded views of FIGS. 12 and 13, elastomeric coupling 208 of power unit 202 is pre-bolted onto its tubular casing 212 via screw holes 222. Elastomeric coupling 208 features a plurality of elastomeric coupling lugs 226

Figure 10:
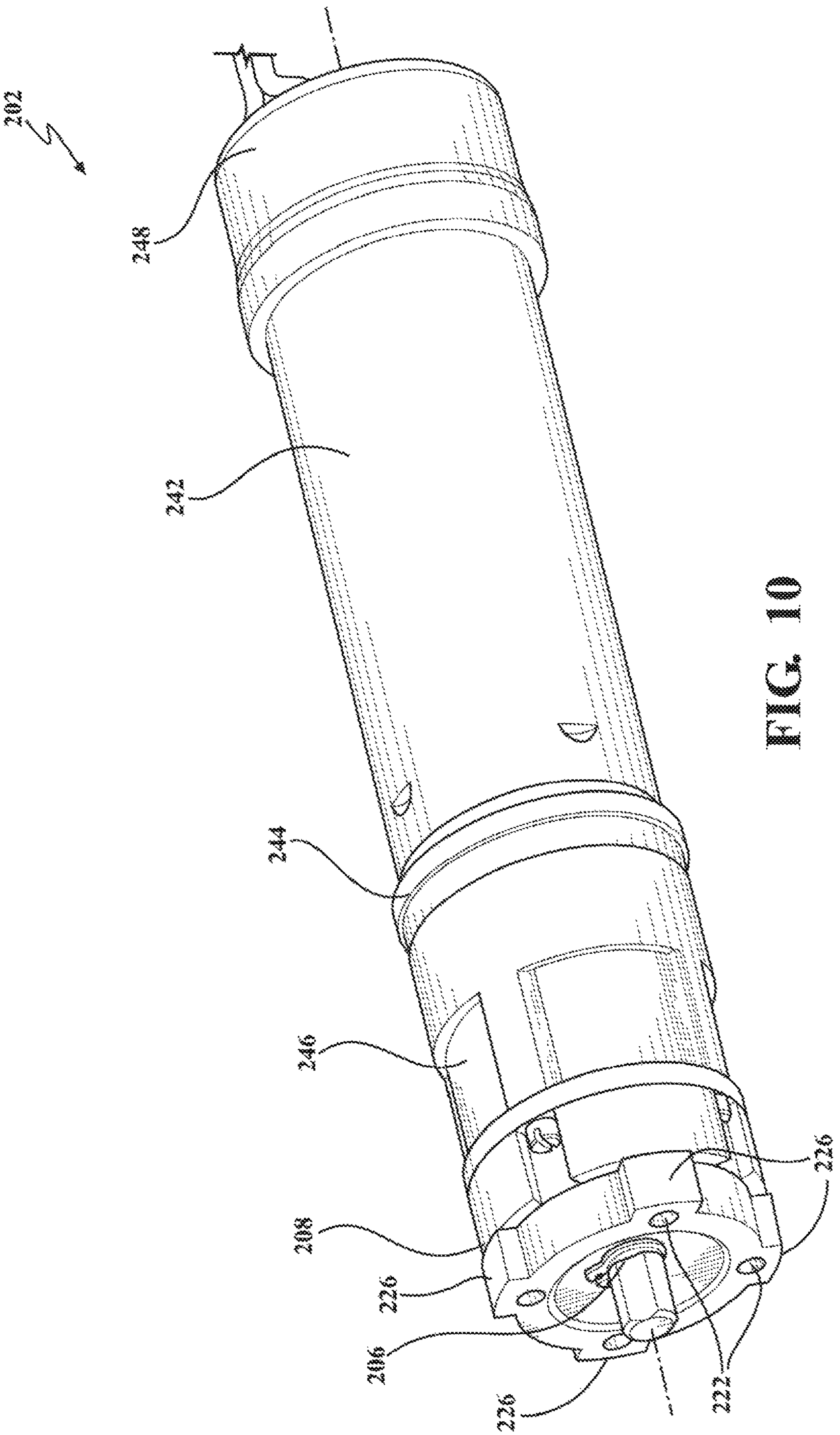
FIG. 10 is an isometric view of a power unit associated with the electromechanical strut of FIG. 8, with its outer casing removed from view for additional clarity.
Figure 12:
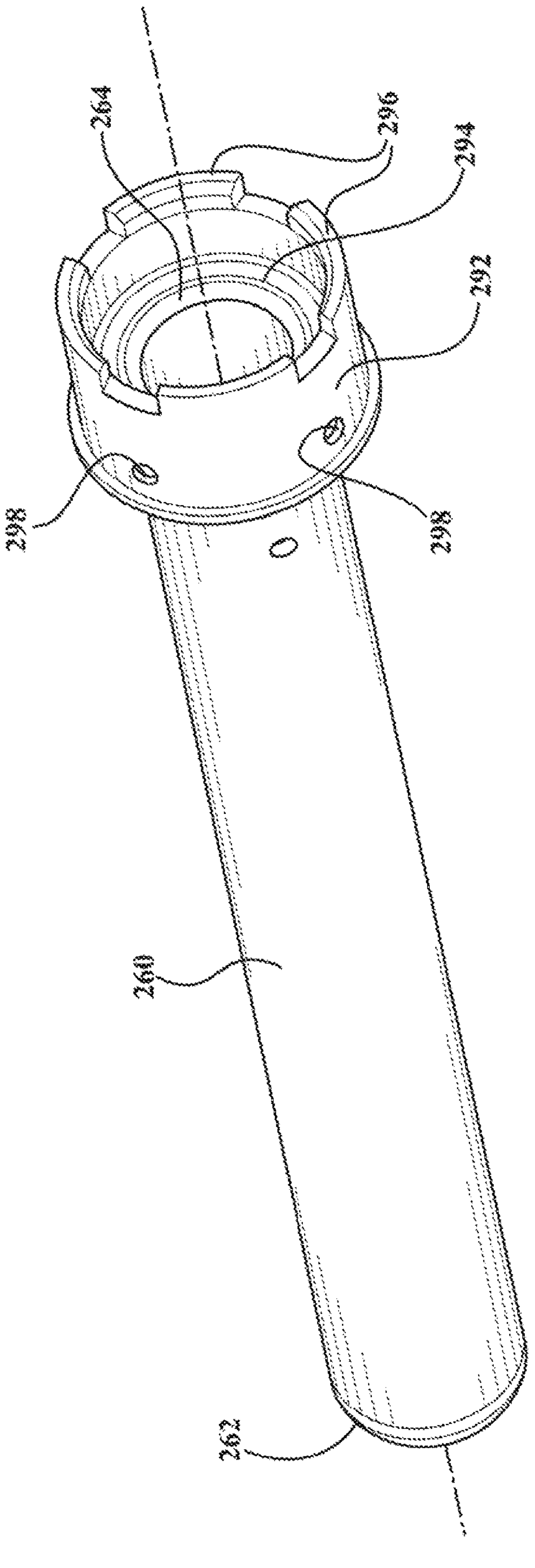
FIG. 12 is an isolated isometric view of a stationary guide tube utilized in the telescoping unit of the electromechanical strut of FIG. 8.
Figure 13:
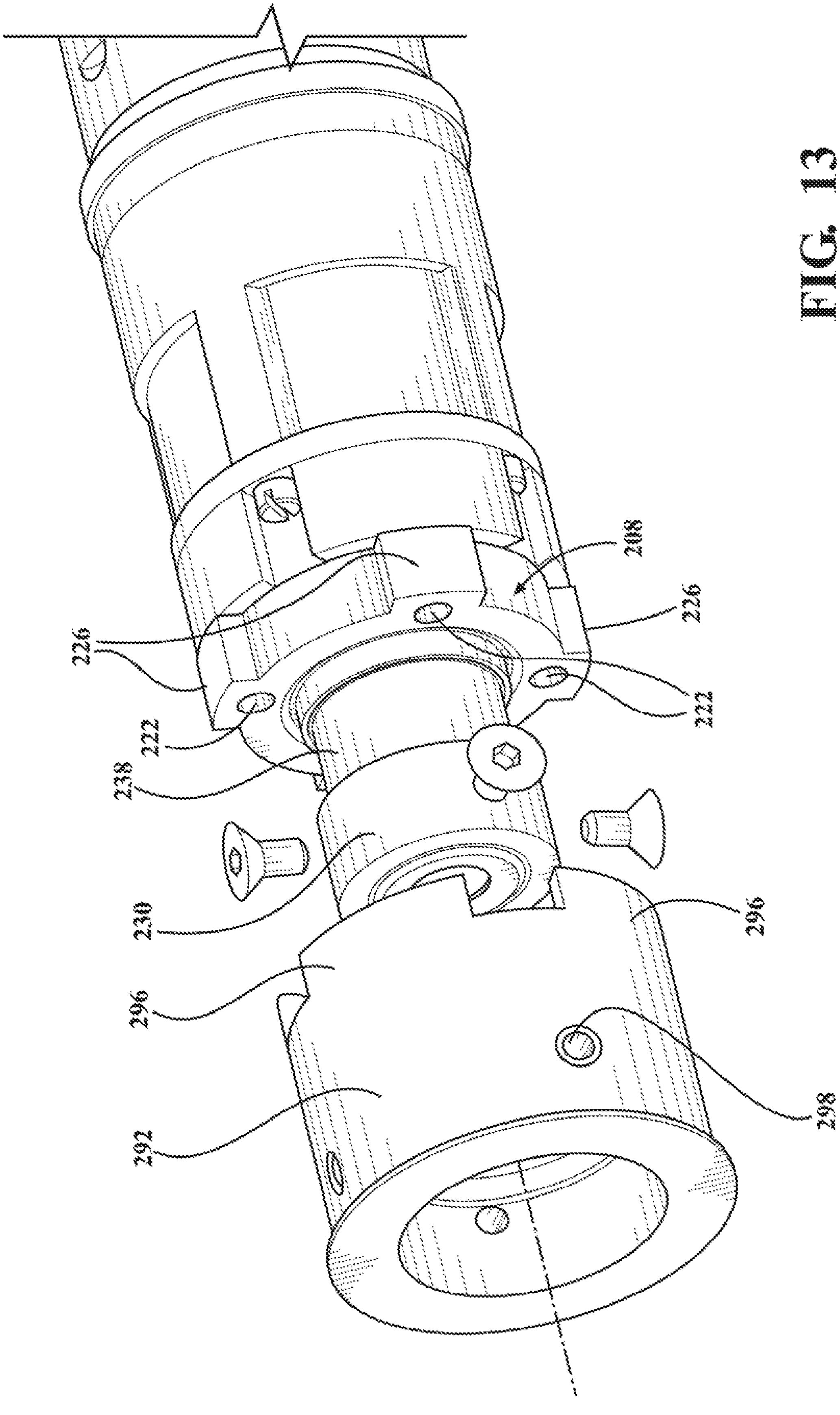
FIG. 13 is a partially exploded fragmentary isometric view of the interface between the telescoping unit and the power unit of the electromechanical strut of FIG. 8.
Figure 14:
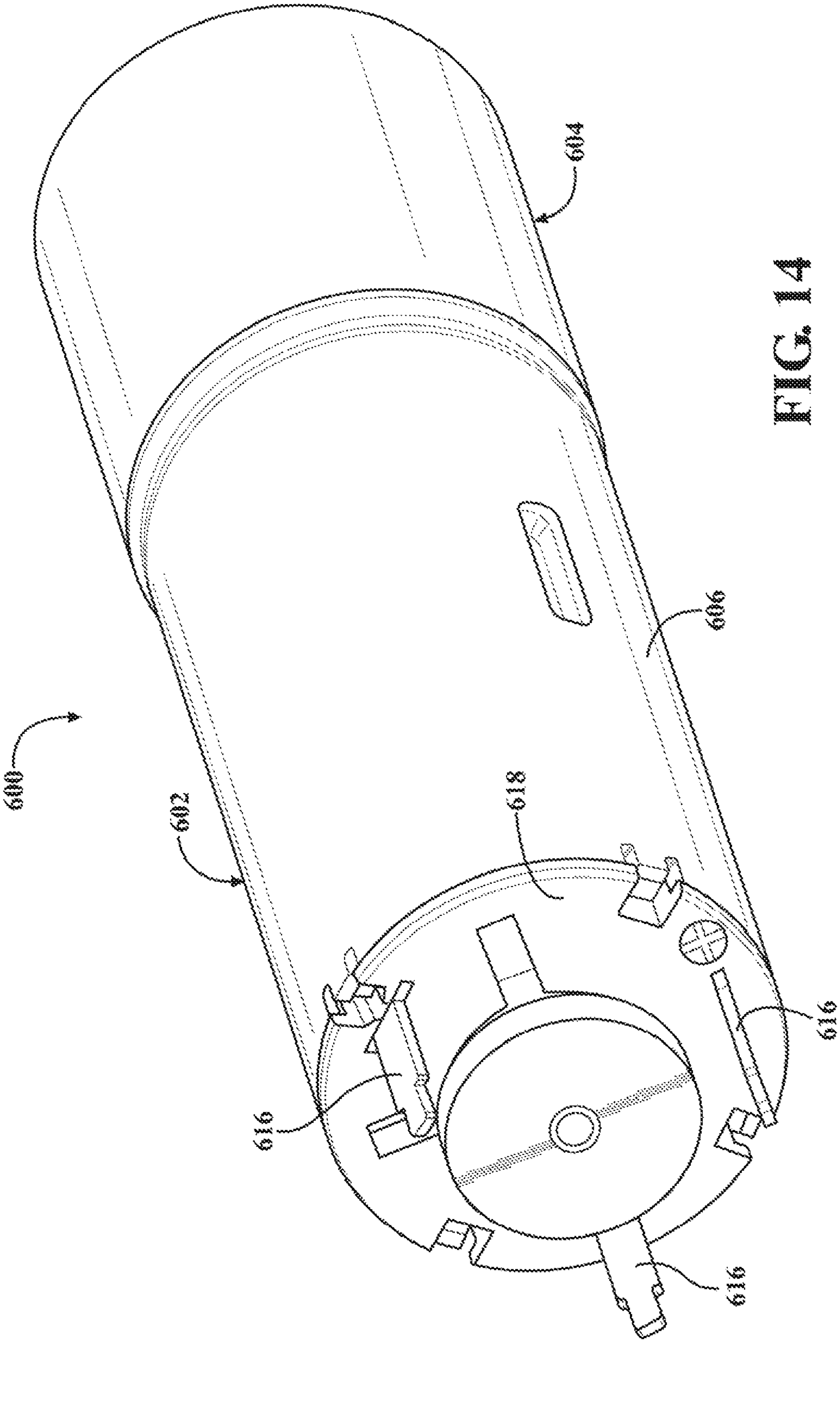
FIGS. 14 and 15 are isometric views of a motor-gearbox assembly constructed in accordance with the teachings of the present disclosure and which is adapted for installation in an electromechanical strut of the type generally shown in FIG. 8.

(FIG. 10). Stationary inner guide tube 260 includes a tubular bearing housing 292 (FIG. 12). For ease of manufacture, tubular bearing housing 292 is a separate piece that is fixedly mounted is fixedly mounted to the end 264 of tube 260. More particularly, tube 260 (or portions thereof) is flared outwardly, as may be readily accomplished in a crimping or punching operation, to create a circlip 294 against the inner wall of the tubular bearing housing 292. Bearing housing 292 also features a plurality of lugs 296 that interdigitatingly mate with lugs 226 of elastomeric coupling 208. In alternative embodiments, stationary guide tube 260 and bearing housing 292 can be formed from one piece.

A tubular gearset coupler 238 is journalled within bearing housing 292 via ball bearings 228 (FIG. 8*ii*). A spacer sleeve 230 mounted over coupler 238 and an internal circlip 232 retain the ball bearings 228 within housing 292. Coupler 238 is elongated with one end of coupler 238 drivingly mating with a butt end 241 of power screw 240. Preferably, a pin 256 fixes spacer sleeve 230 and coupler 238 to the power screw 240. The other end of coupler 238 mates with the power unit output drive shaft 206. As an alternative to the direct connection between drive gear 156 and butt portion 241 of power screw 240, a coupling unit 293, shown in phantom, can be installed there between to provide at least one of a torque-limiting (i.e. slip clutch) function and a torsional/axial damping (i.e. flex damper) function.

Thus, telescoping unit 204 may be quickly and easily attached to power unit 202 by simply slipping coupler 238 over power unit output drive shaft 206 whilst interdigitating lugs 296, 226 of bearing housing 292 and flexible coupling 208. Bearing housing 292 is then preferably fixedly mounted to tubular casing 212 of the power unit 202 via screw holes 298. It should be appreciated that flexible coupling 208 eliminates the need for very precise alignment of power screw 240 with the gearset 246, reducing the need for high precision parts, whilst tolerating a rigid connection between the power screw 240 and planetary gearset 246.

Referring still to FIGS. 8*i*, 8*ii*, and 10, power unit 202 may include additional elastomeric spacers or bumpers. More particularly, an elastomeric spacer 244 (FIG. 8*ii*) is installed within casing 212 between motor 242 and gearset 246. Another bumper 248 (FIG. 8*ii*) is installed within casing 212 at the rear end of the motor 242. Elastomeric bumper 248, spacer 244, and coupling 208 preferably have respective hardnesses of 40, 60 and 80 Durometer Shore A. These elastomeric components isolate motor 242 and gearset 246 from tubular casing 212, dampening the noise and vibration of the system, particularly if the hardness of each elastomeric component is selected to dampen the major harmonic vibrations of the system. In addition, the elastomeric components, particularly coupling 208, enable electromechanical strut 200 to have a “soft start” upon power up, which will tend to increase system durability. In particular, absent extra circuitry, when motor 242 starts up it will tend to have a high starting moment. As strut 200 is prohibited from rotating due to its connection with the vehicle body and lift gate, this high starting moment will be transferred from power unit 202 onto telescoping unit 204. However, elastomeric coupling 208 will reduce the initial impact on the components and hence reduce the wear and tear on the system. As an alternative, elastomeric coupling 208 can be mounted to bearing housing 292 and/or the casing of the power unit 202 may have interdigitating lugs.

In powered operation, torque provided by motor 242 is transferred via gearset 246 to power screw 240 for causing linear motion of extensible member 216 as described above. For manual operation, motor 242 and planetary gearset 246 are back driven. The friction in the system due to the direct engagement of motor 242 and planetary gearset 246 with power screw 240 allows the lift gate 21 to remain still, in any intermediate position, between the open and closed positions. Electromechanical strut 200 thus provides stable intermediate positions for the lift gate 21 (useful, for example, for garages with low ceilings) without power consumption by using the internal friction of motor-gearbox assembly 236.

Power spring 268 provides a mechanical counterbalance to the weight of lift gate 21. Power spring 268 may comprise two serially arranged coil spring segments which assist in raising the lift gate both in its powered and un-powered modes. When extensible member 216 is in the retracted position, power spring 268 is tightly compressed between end cap 218 of extensible member 216 and bearing housing 292 which is supported by tubular casing 212 of power unit 202. As power screw 240 rotates to extend extensible member 216, power spring 268 extends as well, releasing its stored energy and transmitting an axial force through extensible member 216 to help raise lift gate 21. When power screw 240 rotates to retract extensible member 216, or when lift gate 21 is manually closed, power spring 268 is compressed between end cap 218 and the bearing housing 292 and thus recharges.

Referring now to FIGS. 14-26, a motor-gearbox assembly 600 constructed in accordance with a first embodiment is illustrated. While not limited thereto, motor-gearbox assembly 600 is adapted for use with inline electromechanical struts, such as electromechanical struts 10, 10' of FIGS. 1-5, electromechanical strut 100 of FIGS. 6-7B, and electromechanical strut 200 of FIGS. 8-13. For purposes of clarity, motor-gearbox assembly 600 will now be described in conjunction with the modular version of electromechanical strut 200. Accordingly, motor-gearbox assembly 600 is adapted to be associated with power drive unit 202 and be installed within chamber 224 formed in tubular casing 212. Motor-gearbox assembly 600 is generally a two-unit assembly configured to integrate an electric motor unit 602 and a gearbox unit 604 into a common assembly. Electric motor unit 602 includes a cylindrical motor housing 606 defining an internal motor chamber 608 within which a stator assembly (not shown) and a rotor shaft 610 are operably disposed. Rotor shaft 610 is supported for rotation about the central axis of motor-gearbox assembly 600 via a pair of laterally-spaced bearing assemblies 612 and 614. A plurality of electrical connectors 616 extend through an endplate 618 that is rigidly secured to motor housing 606 to provide electrical power to the stator assembly. A holder end cap (not shown) is attached to motor housing 606 for enclosing electrical connectors 616 therein. Rotor shaft 610 defines a rotary motor output member or component 620 which extends through an aperture 624 formed through a cup-shaped end segment 622 of motor housing 606. As seen, bearing assembly 614 is installed within aperture 624. Aperture 624 extends through an annular boss segment 626 extending axially and outwardly from end segment 622 of motor housing 606. As will be detailed, motor output component 620 is arranged to drive a rotary input component of a dual-stage planetary geartrain 630 associated with gearbox unit 604.

Figure 15:
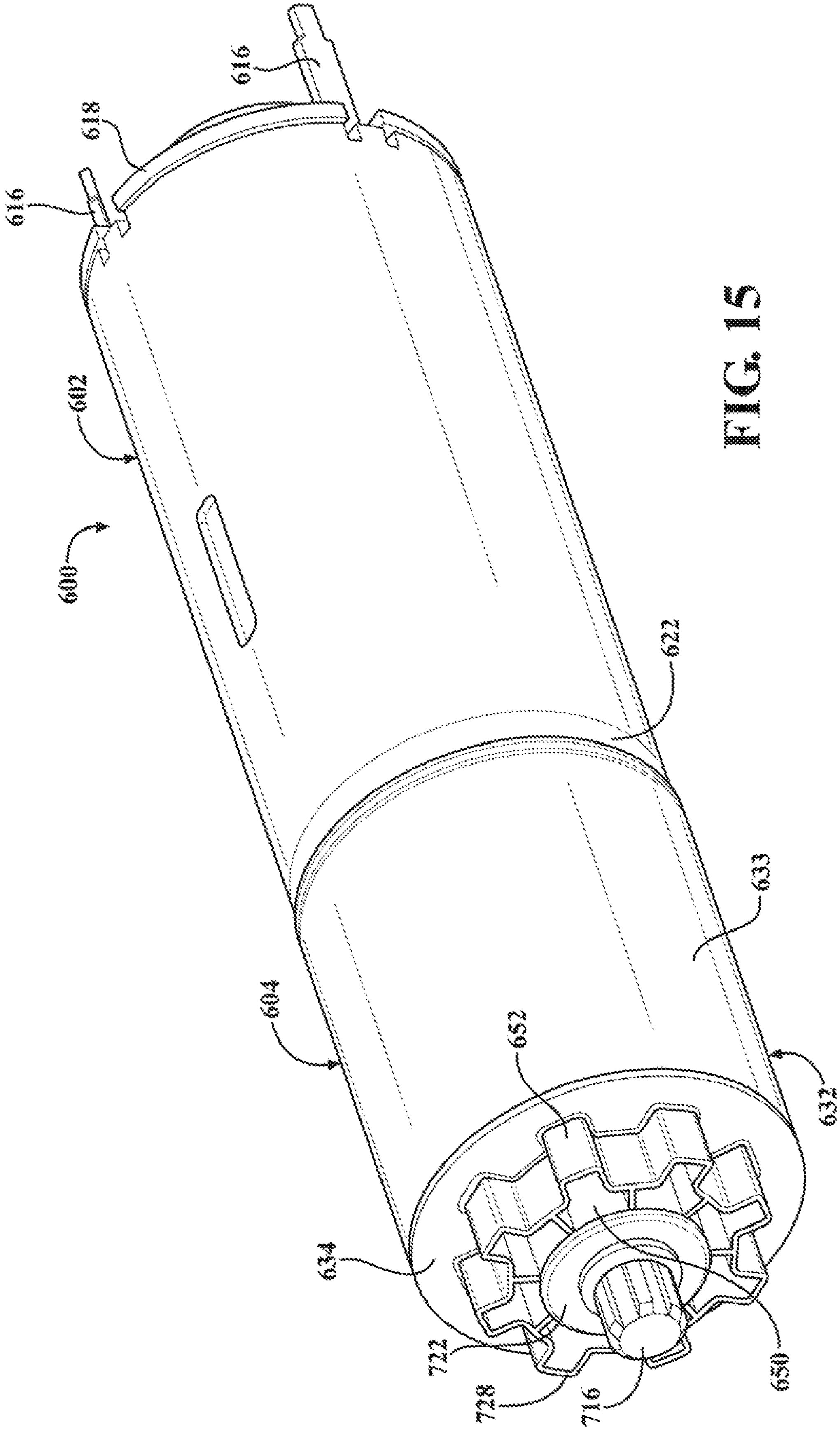
Figure 16:
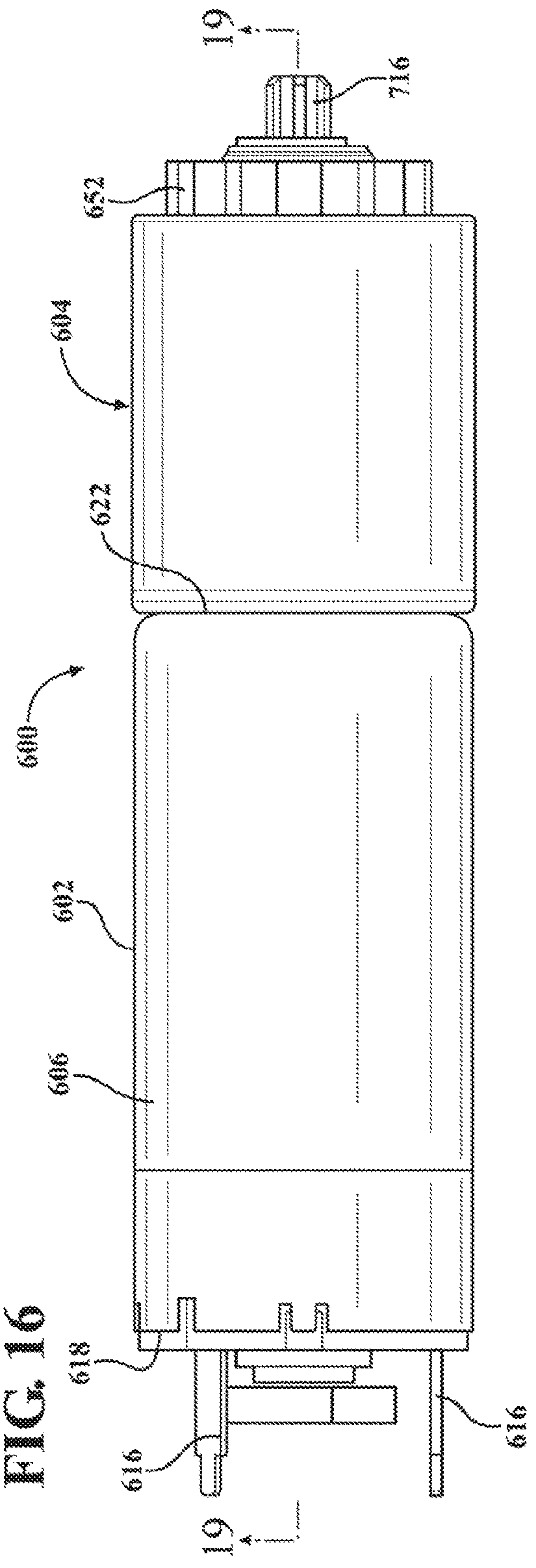
FIG. 16 is a side view of the motor-gearbox assembly shown in FIGS. 14 and 15.
Figure 18:
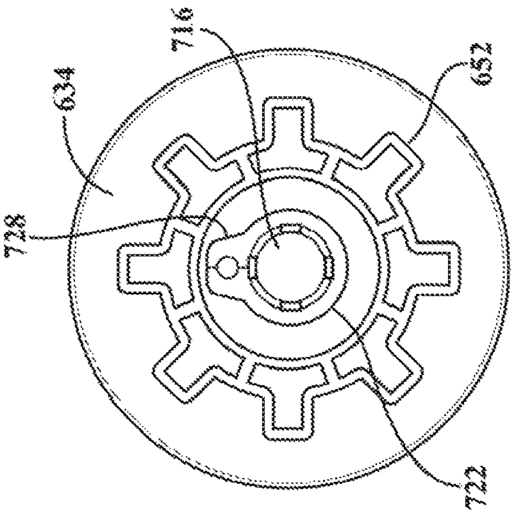
FIGS. 17 and 18 are end views of the motor-gearbox assembly of FIG. 16.
Figure 17:
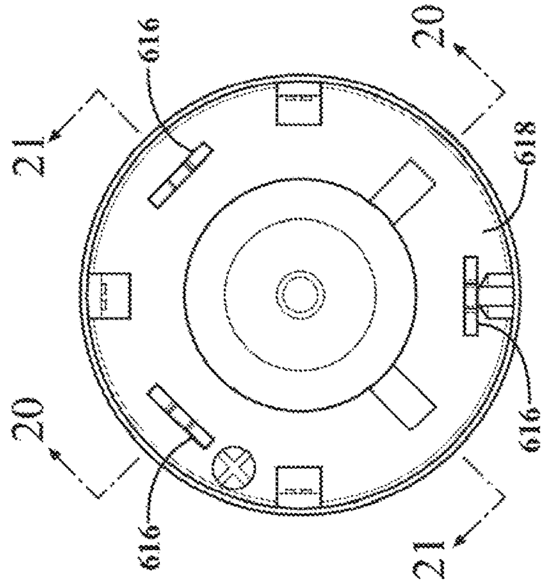
Figure 19:
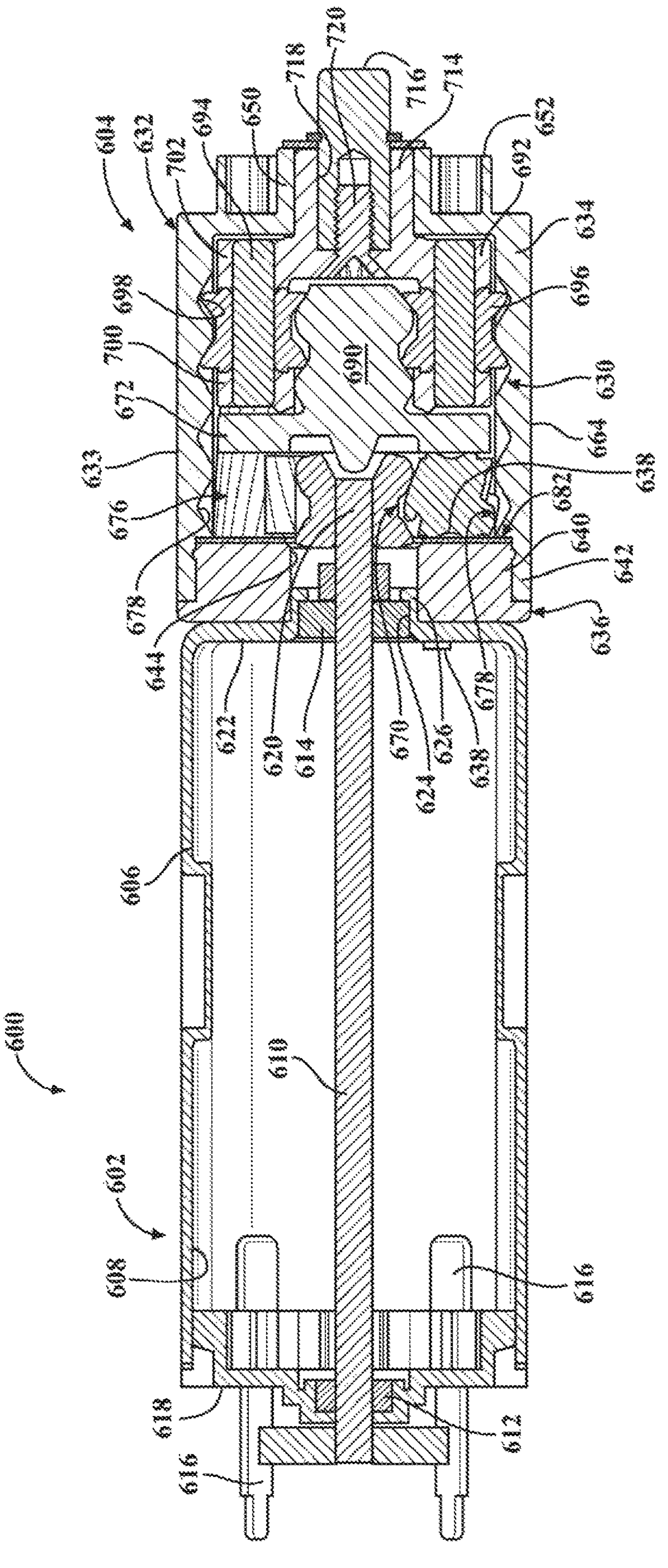
FIG. 19 is a longitudinal sectional view of the motor-gearbox assembly taken generally along line 19-19 of FIG. 16 showing the components of the electric motor unit and the gearbox unit in more detail.
Figure 20:
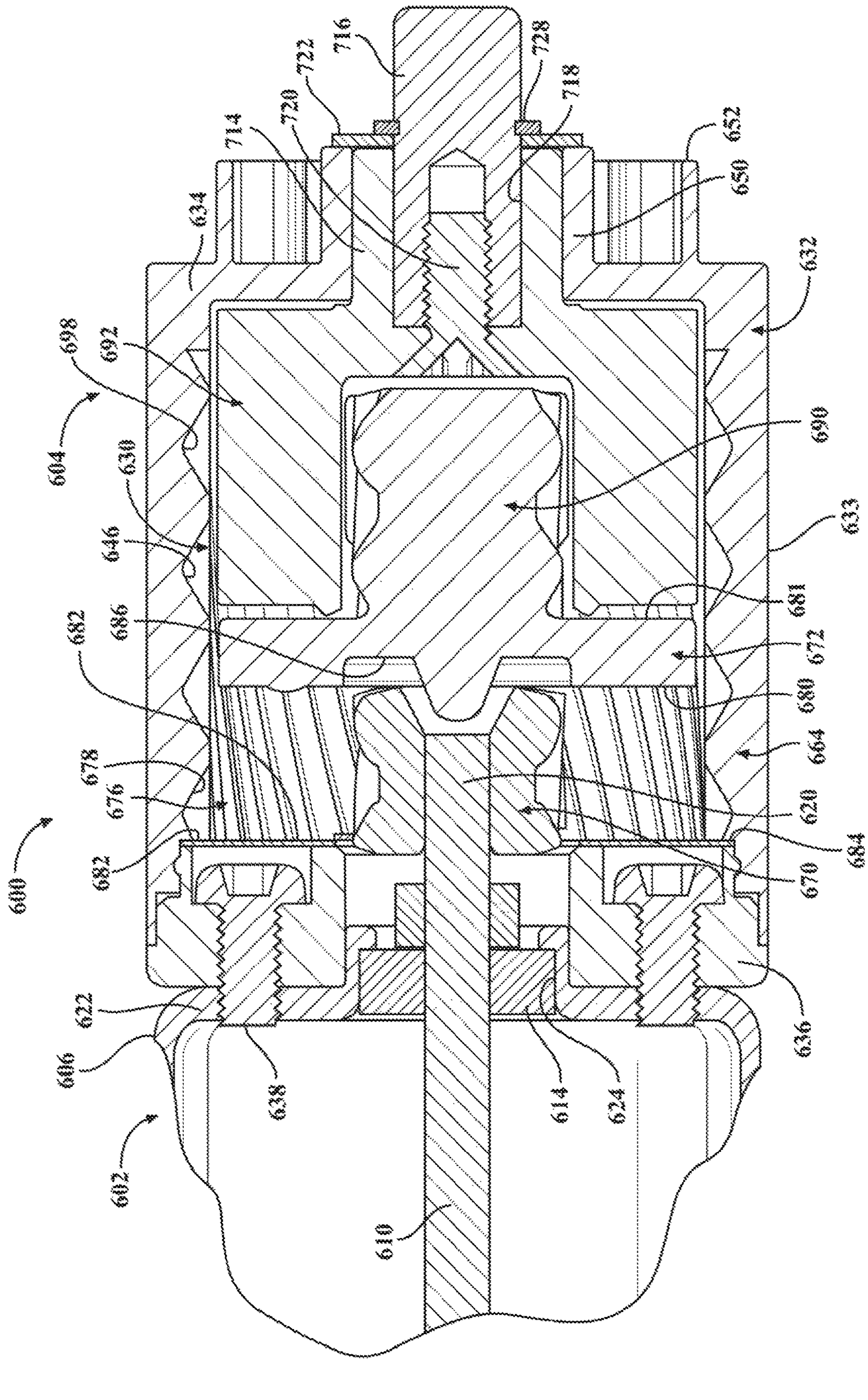
FIG. 20 is a partial sectional view of the gearbox unit of the motor-gearbox assembly taken generally along line 20-20 of FIG. 17 showing the components of a dual-stage planetary geartrain in more detail.
Figure 21:
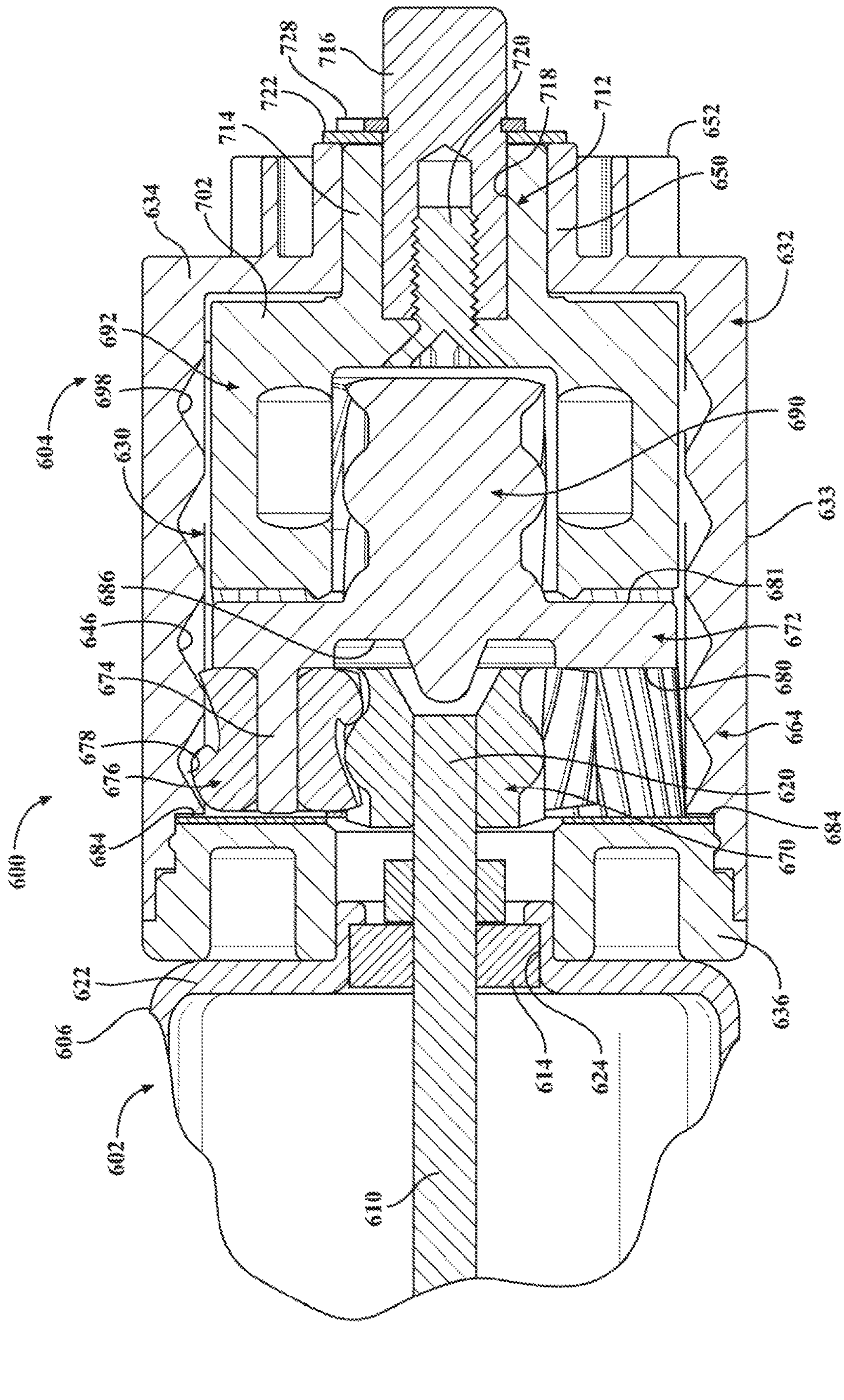
FIG. 21 is another partial sectional view of the gearbox unit taken generally along line 21-21 of FIG. 17.

Gearbox unit 604 is shown to include a gearbox housing 632 having a cylindrical drum segment 633 and a cup-shaped end segment 634. A cover ring 636 is secured to cup-shaped end segment 622 of motor housing 606 via a plurality of fasteners, such as screws 638. Cover ring 636 is configured to include an outer annular flange section 640 that is sized for receipt and retention within a recessed end portion 642 associated with drum segment 633 of gearbox housing 632. A releaseable connector, such as a twist-lock arrangement, is provided between flange section 640 of cover ring 636 and end portion 642 of drum segment 633 for releaseably securing gearbox housing 632 to motor housing 606. Cover ring 636 also includes a central aperture 644 surrounding boss segment 626 of motor housing 606 and through which motor output component 620 extends into an internal gearbox chamber 646 defined within gearbox housing 632. Cover ring 636 is formed of suitably rigid material selected to dampen vibration and act as an isolator between motor unit 602 and gearbox unit 604. As best seen in FIG. 15, cup-shaped end segment 634 of gearbox housing 632 defines a tubular boss 650 and a series of circumferentially-aligned lugs 652 surrounding boss 650. Lugs 652 are provided for simply and accurately attaching power drive unit 202 equipped with motor-gearbox assembly 600 to telescopic unit 204 via flexible coupling 208 in a manner similar to that described in detail for electromechanical strut 200 and as shown in FIGS. 8-13.

Dual-stage planetary geartrain 630 is installed within gearbox chamber 646 and generally includes a first stage gearset 660 and a second stage gearset 662 cooperatively associated with a uniform or “common” ring gear 664 that is integrally formed in, or rigidly secured to, an inner surface of cylindrical drum segment 633 of gearbox housing 632.

More specifically, first stage gearset 660 includes a first stage rotary input member, also referred to as rotary input component, shown as a first sun gear 670 coupled for common rotation with motor output component 620, a first stage rotary output member, also referred to as rotary output component, shown as first planet carrier 672 having a plurality of circumferentially-aligned and axially-extending first pins 674, and a plurality of first satellite or planet gears 676 each being rotatably supported on a corresponding one of the plurality of first pins 674. First pins 674 can be formed integrally with, or rigidly secured to, first planet carrier 672. In the particular non-limiting example shown, a plurality of three (3) first planet gears 676 are provided in association with first stage gearset 660. Each of the plurality of first planet gears 676 is in constant mesh with first sun gear 670 and a first ring gear segment 678 of common ring gear 664. In accordance with a preferred construction, each of first sun gear 670, first planet gears 676 and first ring gear segment 678 of common ring gear 664 are formed with helical gear teeth. To accommodate axially-directed thrust loads generated by the helical gearing, first planet gears 676 are located between a planar thrust face surface 680 of first planet carrier 672 and a thrust ring 682 engaging a planar thrust face surface 684 of cover ring 636. First planet carrier 672 functions as a first stage output component and is shown to include a recessed face surface 686 offset from thrust face surface 680 and aligned with first sun gear 670.

Figure 24:
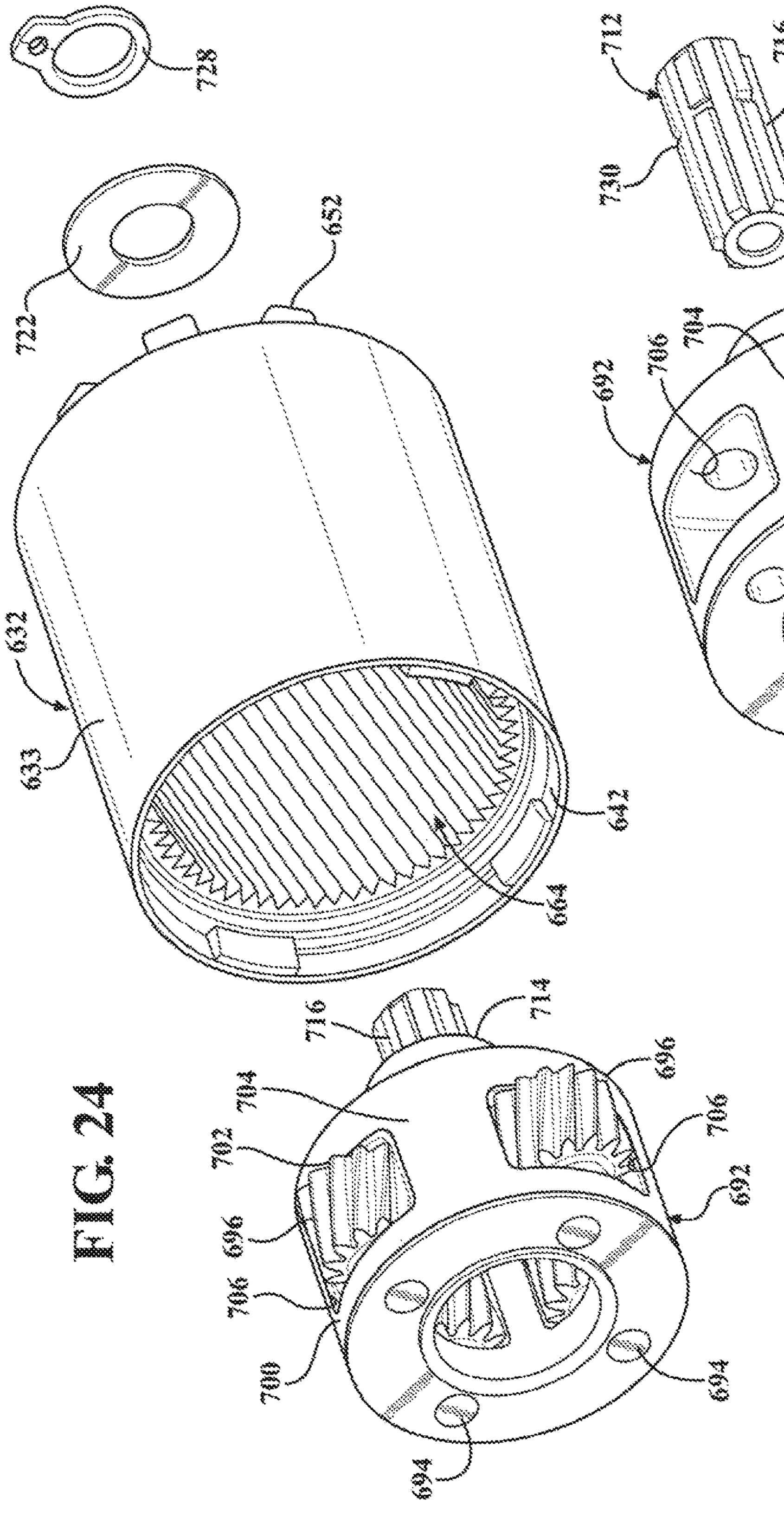
FIG. 24 is another exploded isometric view illustrating the second stage gearset and the gearbox housing in greater detail.
Figure 25:
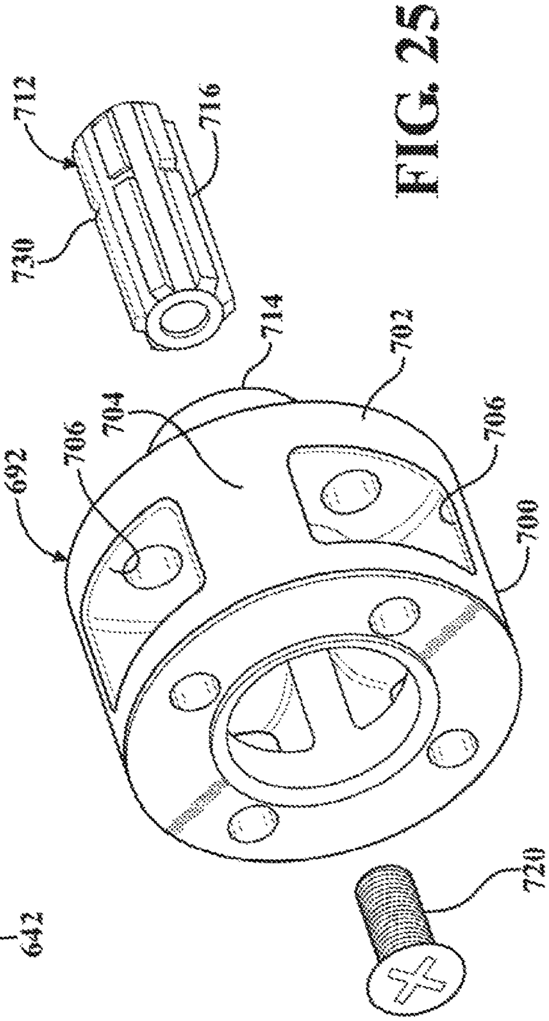
FIGS. 25 and 26 are exploded isometric views of the second stage gearset.
Figure 26:
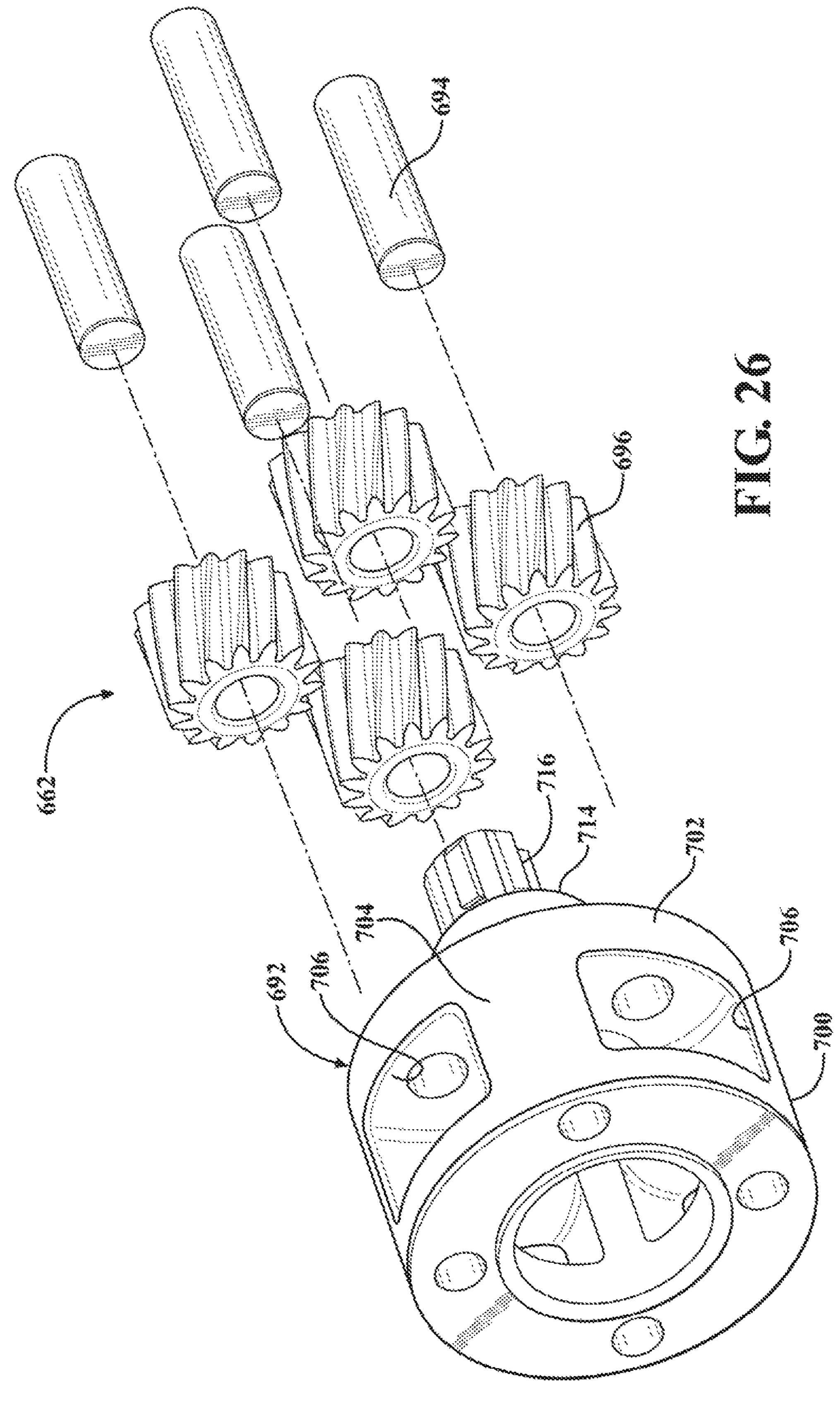

Second stage gearset 662 includes a second stage input member, also referred to as second stage input component, shown as a second sun gear 690 driven by the first planet carrier 672 (first stage output component), a second planet carrier 692, which functions as a second stage output member, also referred to as second stage output component, having a plurality of circumferentially-aligned and axially-extending second pins 694, and a plurality of second satellite or planet gears 696 each being rotatably supported on a corresponding one of the plurality of second pins 694. Second sun gear 690 can be formed integrally with, or rigidly secured to, first planet carrier 672. Likewise, second pins 694 can be formed integrally with, or rigidly secured to, second planet carrier 692. In accordance with the non-limiting example shown, a plurality of four (4) second planet gears 696 are provided in association with second stage gearset 662. Each second planet gear 696 is in constant mesh with second sun gear 690 and a second ring gear segment 698 of common ring gear 664. In accordance with a preferred construction, each of second sun gear 690, second planet gears 696 and second ring gear segment 698 of common ring gear 664 are formed with helical gears. To accommodate axial thrust loads, each second planet gear 696 is mounted on one of second pins 694 extending between first and second carrier ring segments 700, 702 of second planet carrier 692 and which provide planar thrust surfaces. First and second carrier ring segments 700, 702 are best shown in FIG. 24 to be interconnected by web segments 704 extending between window apertures 706 through which a portion of second planet gears 696 rotatably extend.

Figure 22:
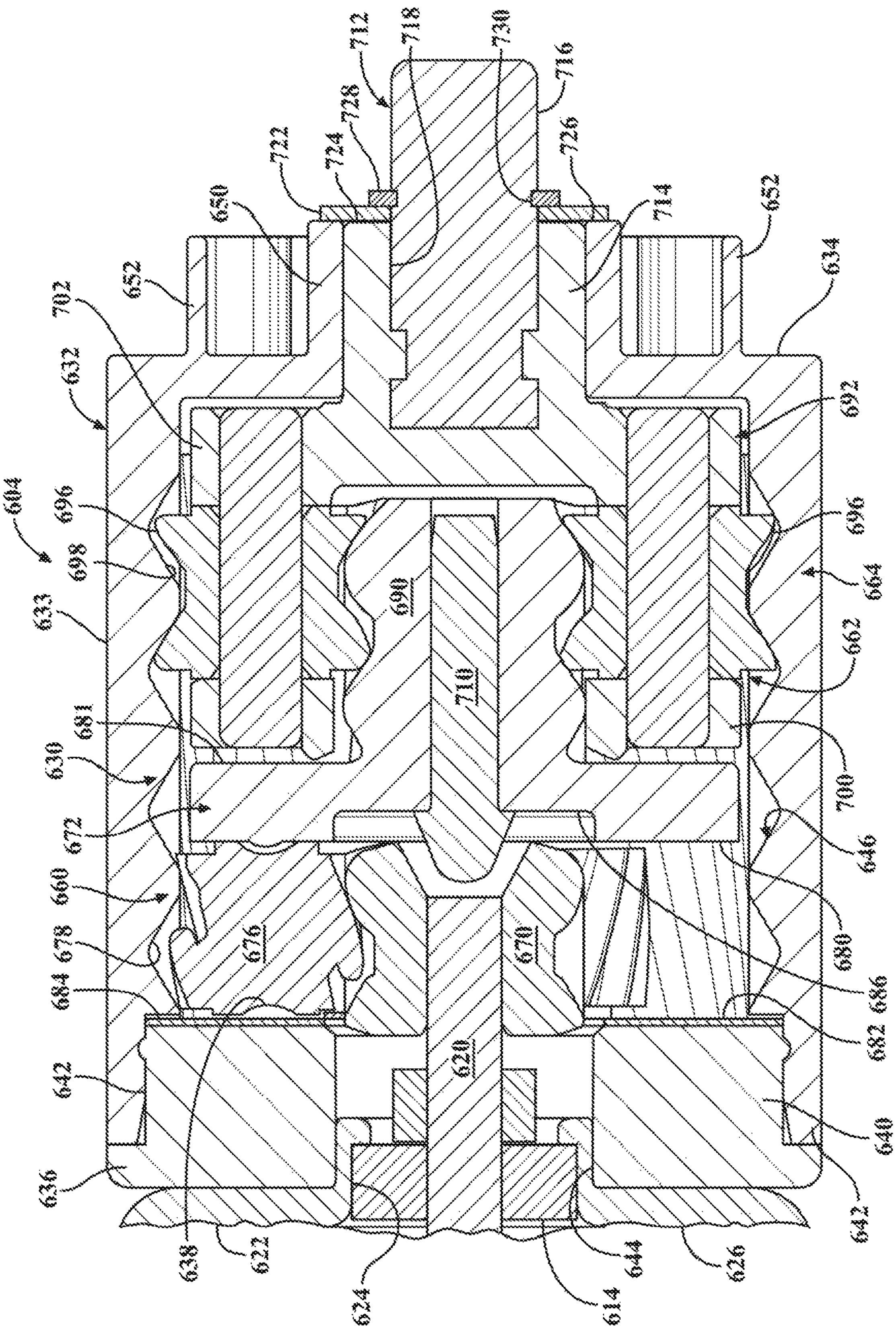
FIG. 22 is another sectional view illustrating the dual-stage planetary geartrain associated with the gearbox unit of the motor-gearbox assembly.
Figure 23:
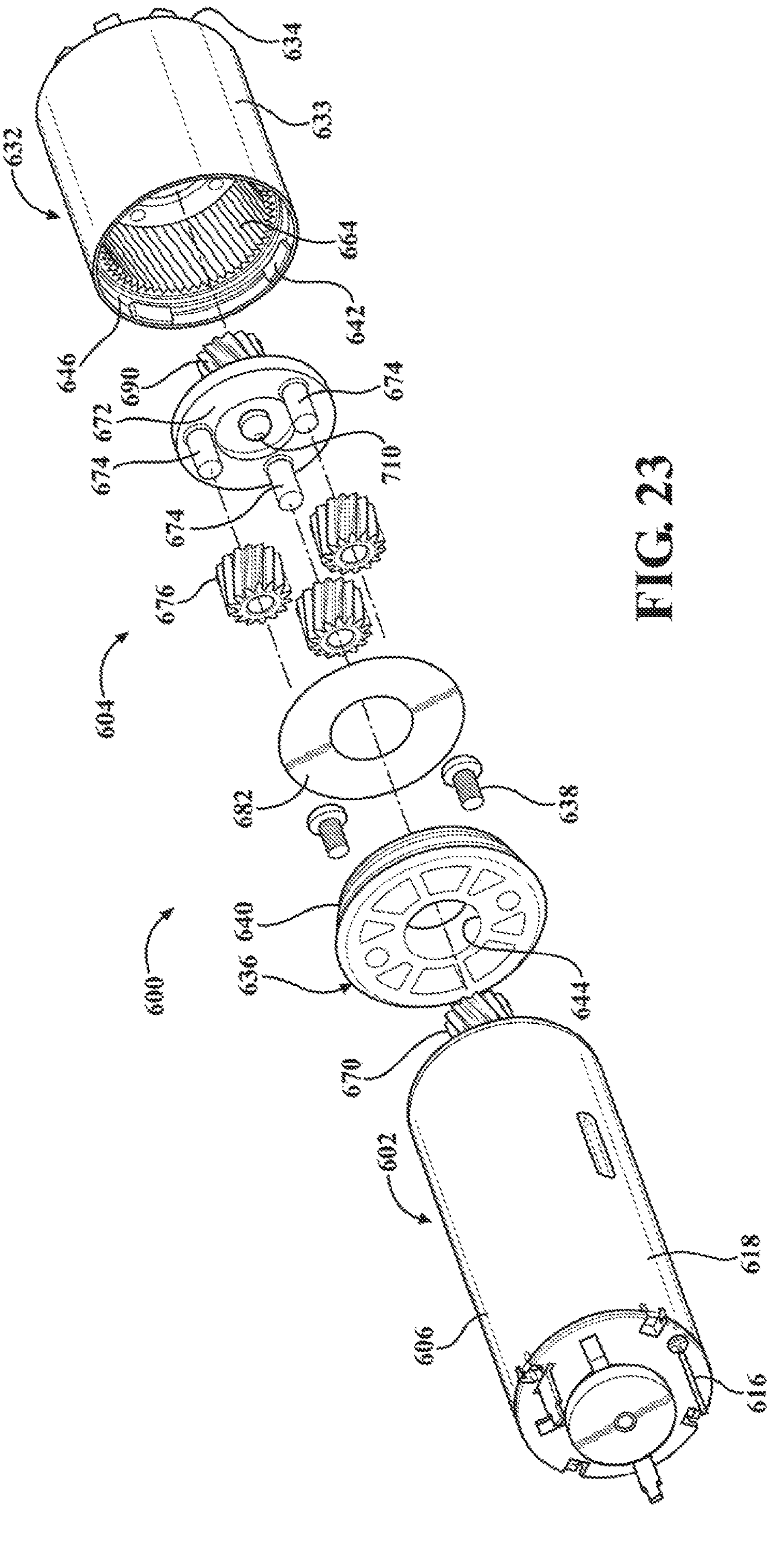
FIG. 23 is an exploded isometric view of the motor-gearbox assembly illustrating the dual-stage planetary geartrain to include a first stage gearset and a second stage gearset sharing a common ring gear integrated into a gearbox housing.

Second sun gear 690 is shown in FIG. 22 to be securely fastened via a suitable fastener, such as a threaded screw 710, for common rotation with first planet carrier 672. However, as mentioned, second sun gear 690 can be formed integrally with first planet carrier 672 in alternative configurations. A rotary output component 712 of dual-stage planetary geartrain 630 is drivingly coupled for rotation with second carrier ring segment 702 of second planet carrier 692. More specifically, second planet carrier 692 includes a tubular stub shaft segment 714 formed integrally with, or rigidly secured to, second carrier ring segment 702. Stub shaft segment 714 is configured to be rotatably disposed within boss 650 of gearbox housing 632. Output component 712 is shown to be an externally-lugged gearbox output shaft 716 having a first portion retained in a central aperture 718 formed in stub shaft segment 714 of second planet carrier 692. A suitable fastener, such as threaded screw 720 (FIG. 25), can be used to secure the first portion of gearbox output shaft 716 to second planet carrier 692 alone or in combination with meshing lugs (not shown) formed in aperture 718. A thrust ring 722 is aligned in proximity to a terminal end 724 of stub shaft segment 714 and engages a terminal end surface 726 of boss 650. Thrust ring 722 is axially retained via a retainer clip 728 installed in a mounting grove 730 formed in a second portion of gearbox output shaft 716. The second portion of gearbox output shaft 716 is adapted to be drivingly connected to the input of a clutch/coupling assembly, either directly or via an intermediate coupler device. In those applications without a clutch/coupling device, gearbox output shaft 716 can be directly coupled to an input segment of the power screw.

Based on the arrangement disclosed, first stage gearset 660 is configured to provide a first speed reduction between motor output component 620 and first planet carrier 672. Thus, first sun gear 670 acts as the input component of first stage gearset 660, first planet carrier 672 acts as its output component, while first ring gear segment 678 acts as its reaction component. Furthermore, second stage gearset 662 is configured to provide a second speed reduction between first planet carrier 672 and second planet carrier 692. Specifically, since second sun gear 690 is drivingly coupled for rotation with first planet carrier 672, it acts as the input component for second stage gearset 662. Likewise, since gearbox output shaft 716 is fixed for rotation with second planet carrier 692, it acts as the output component of second stage gearset 662 while second ring gear segment 698 of common ring gear 664 acts as its reaction component. Thus, a dual-stage reduction ratio drive connection is established between motor output component 620 and gearbox output component 716.

In accordance with one preferred construction for dual-stage planetary geartrain 630 it is contemplated that first ring gear segment 678 and second ring gear segment 698 of common ring gear 664 have the identical diameter and tooth pattern for providing commonality between both of first stage gearset 660 and second stage gearset 662, thereby permitting simplified manufacture, reduced noise and optimized alignment of the geared components within gearbox housing 632. In addition, the use of commonly-aligned and sized first pins 674 and second pins 694, in combination with uniform first and second ring gear segments of ring gear 664, permits use of the same satellite (planet) gears and similarly-sized sun gears for first stage gearset 660 and second stage gearset 662. The tooth pattern of common ring gear 664 is shown to be a continuous helical gear tooth pattern associated with first ring gear segment 678 and second ring gear segment 698. As such, helical gear teeth are also formed on the first and second planet gears as well as the first and second sun gears. However, the present disclosure is intended to also include the optional use of straight toothed (i.e. spur gear) gear components for dual-stage planetary geartrain 630.

To reduce weight, it is contemplated that first planet carrier 672 and/or second planet carrier 692 can be formed from rigid plastic materials or lightweight metal, such as aluminum. Likewise, gearbox housing 632 and its integrally-formed common ring gear 664 can also be made from plastic. Gearbox housing 632 preferably has a common outer diameter along its entire length. It is also contemplated that equal numbers of first and second planet gears may be used for dual-stage planetary geartrain 630, that common planet carriers may be used, and that single ring-type carriers (e.g. carrier 672) or dual ring-type carriers (e.g. carrier 692) can be used. Furthermore, different materials for the planet carriers and/or the pins can be used to accommodate torque requirements such as, for example, plastic components associated with first stage gearset 660 and metal components associated with second stage gearset 662. The use of such components permits a modular design approach and accommodate varying strength requirements while maintaining common gear component sizes for interchangeability.

While gearbox unit 604 has been shown associated with a specific motor unit 602, it is to be understood that any type of electric motor having a rotary output can be used in combination with gearbox unit 604. More specifically, gearbox unit 604 is adapted to be installed with any suitable electric motor unit to define motor-gearbox assembly 600. As such, the specific construction and type of the electric motor is not limiting provided it has a rotary output component capable of being coupled to the input of dual-stage planetary geartrain 630. Furthermore, the designation of first and second ring gear segments of common ring gear 664 is not intended to infer that different helical gear tooth profiles/configurations are required since this disclosure relates to a common ring gear 664 having a continuous helical gear tooth pattern.

In one non-limiting arrangement, the combination of teeth number associated with common ring gear 664 and first sun gear 670 and second sun gear 690 are selected to permit first stage gearset 660 to include a plurality of three (3) first planet gears 676 and second stage gearset 662 to include a plurality of four (4) second planet gears 696 to provide a desired overall speed reduction and torque multiplication while providing a very compact geartrain arrangement. However, dual-stage planetary geartrain 630 can also be configured to use differently sized planet gears and sun gears to establish differing speed ratio reductions between first stage gearset 660 and second stage gearset 662 in conjunction with common ring gear 664. In addition, gearbox unit 604 can also be adapted for use in an offset motor-gearbox assembly (FIG. 6) simply by configuring the arrangement to drive motor output component 620 via a transverse gearset (i.e., worm gearset) and electric motor unit. Accordingly, the present disclosure contemplates use of helical gearing in both stages of a dual-stage planetary geartrain; similarly sized pins associated with the planet carriers; use of commonly sized helical planet and sun gears; use of differing materials to meet strength and noise requirements; and provide a modular approach to motor-gearbox assemblies. Finally, it should be understood that a gearbox unit equipped with a dual-stage planetary geartrain can be adapted for use in other types of linear and rotary actuators such as those, for example, used to move a four-bar linkage for powered convertible top systems.

In addition to the above, the following is a summary of some advantageous features associated with the dual-stage planetary geartrain 630. The use of a planetary gearbox having common ring gear 664 (continuous interior of same diameter and continuous tooth pattern) for use with first and second stage gearsets 660, 662 provides ease of manufacture, reduced noise and improved gear alignment. Additionally, the use of the same size pins 674, 694 in combination with common ring gear 664 allows for common planet gears 676, 696 to be used in both the first and second stage gearsets 660, 662. Different materials can be used for pins 674, 694 to accommodate loading in both the first and second stage gearsets 660, 662 such as, for example, using plastic pins 674 in the first stage gearset 660 and metal pins 694 in second stage gearset 662. Differing types of planet carriers (single carrier plate, dual carrier plates) and/or integration of both planet carriers into a common unit are also possible contemplated alternatives. Additionally, such an integrated carrier unit can be molded together with the planet gears and the pins (for example, compression molding or injection molding of plastics or powdered metals. Other features may include use of plastic planet carriers in combination with metallic pins to reduce overall mass while providing low-friction high-strength axes for the planet gear rotation. Finally, the ability to use differing number of planet gears 676, 696 for first stage gearset 660 and second stage gearset 662 in combination with common ring gear 664 provides enhanced load capabilities, non-equivalent ratio reductions and easier assembly.

In accordance with a preferred configuration, first planet carrier 672 is molded as a one-piece component having first pins 674 extending axially from first planar surface 680 and second sun gear 690 extending axially from a second planar surface 681. The length of first pins 674 may be selected to extend beyond the end of first planet gears 674 with their terminal ends engaging planar surface 684 of cover ring 636 so as to permit elimination of thrust ring 682.

Figure 27:
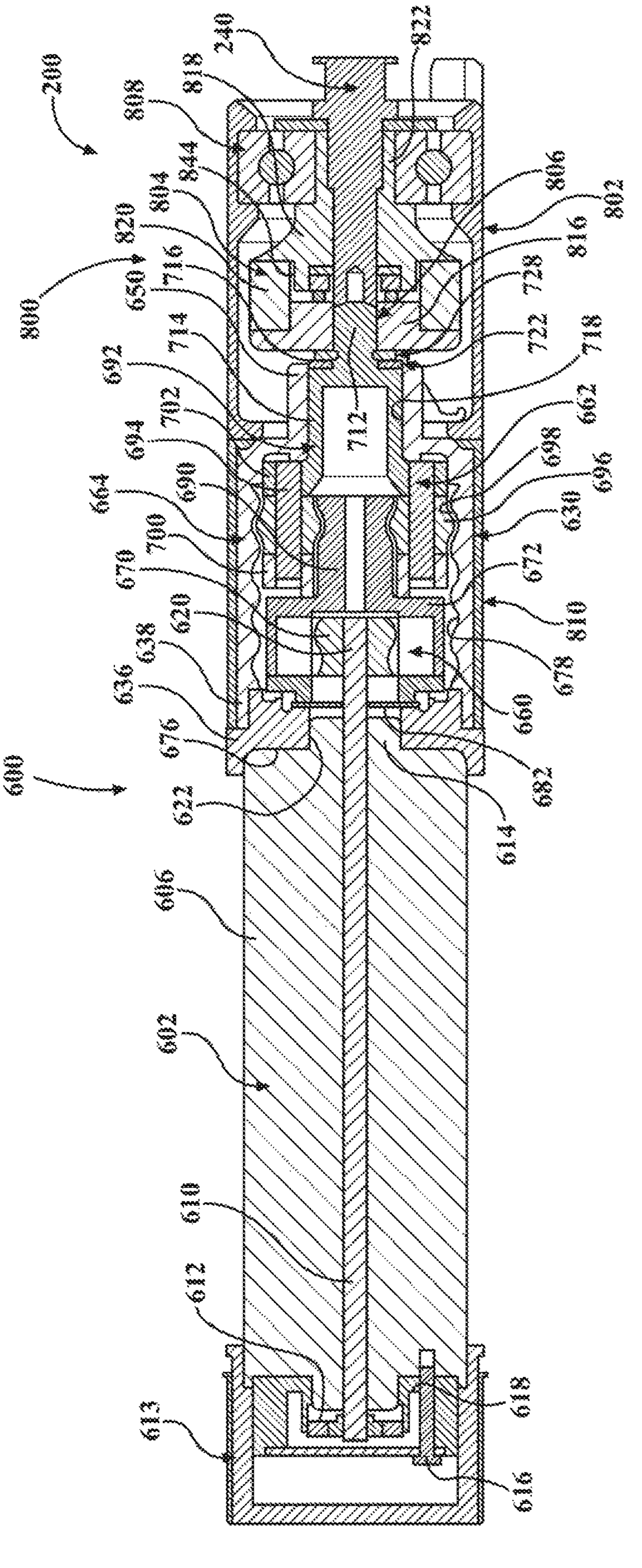
FIG. 27 is a longitudinal sectional view of another version of a motor-gearbox assembly configured to include a flex coupling between the second stage gearset of the dual-planetary geartrain and the power screw of the telescoping unit.
Figure 28:
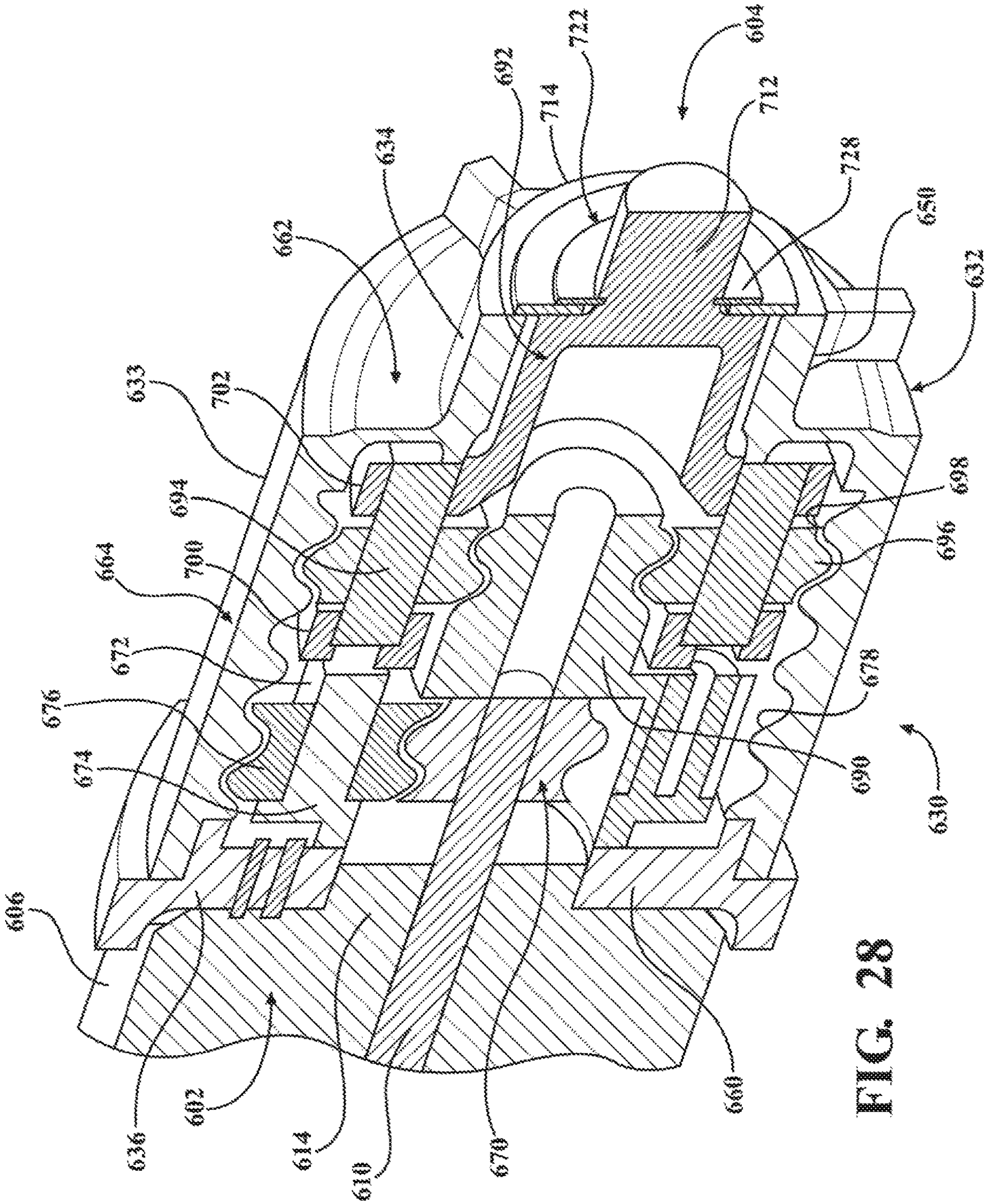
FIG. 28 is a sectional isometric view of the motor-gearbox assembly shown in FIG. 27.

Referring now to FIGS. 27 and 28, motor-gearbox assembly 600 (FIGS. 14-16) is now shown to further include a flex coupling unit 800 configured to operably connect rotary output component 712 of dual-stage planetary geartrain 630 to power screw 240 of telescoping unit 204 associated with electromechanical strut 200. In general, flex coupling unit 800 includes a coupling holder 802, a flex coupling assembly 804, an adaptor 806, and a bearing assembly 808. In the arrangement shown, a tubular spacer 810 surrounds drum segment 633 of common ring gear 664 and interconnects cover ring 636 to coupling holder 802. Flex coupling assembly 804 includes a drive member or sprag ring 816 drivingly connected (i.e. splined) to gearbox output shaft 716, a driven member or coupler plate 818, and elastomeric, resilient flex member 820 having lugs L interdigitated between lugs 840, 844 extending axially respectively from sprag ring 816 and coupler plate 818. Coupler plate 818 includes a quill shaft segment 822 supported for rotation relative to coupling holder 802 via bearing assembly 808. Adaptor 806 is drivingly connected (i.e. splined) to coupler plate 818 and provides a drive connection to power screw 240. Resilient coupling member 820 interacts with the axially extending lugs 844 of coupler plate 818 to define a first drive interface with the output component of the planetary geartrain 630 and with the axially extending lugs 840 of sprag ring 816 to define a second drive interface with the power screw 240 to transfer drive torque from gearbox output shaft 712 to power screw 240 while accommodating misalignments (i.e. axial, concentric, angular, etc.) therebetween and damping torque pulses to reduce motor operating noise. Flex coupling assembly 804 may also be configured to provide a torque slip feature in the event of "over-torque" situations so as to allow power screw 240 to rotate relative to output shaft 712 of geartrain 630 under certain situations.

The present disclosure is also directed to providing supplemental back-drive friction within the electromechanical strut to enhance the "stop and hold" lift gate functionality throughout a desired range of lift gate 21 travel. This desired range may be, for example, defined by travel of lift gate 21 between a gate partially (i.e. ⅓) open position and a gate full-open position. This supplemental back-drive friction is provided, in accordance with the teachings of the present disclosure, via integration or installation of a supplemental friction mechanism, also referred to as spring-loaded supplemental friction (SLSF) mechanism 900, into power drive unit 202 of electromechanical strut 200. SLSF mechanism 900 is generally operable, in the non-limiting examples hereafter disclosed, to generate and exert a normal (acting perpendicularly on) force on the coupling interface between gearbox unit 604 and power screw 240. This normal force creates a frictional torque when the output component 712 of gearbox unit 604 attempts to rotate relative to power screw 240, such as through flex coupling assembly 804. This frictional torque is subsequently translated into a linear holding force at the output of telescoping unit 204 configured to resist motor-gearbox assembly 600 being back-driven. This linear holding force supplements (adds to) the back-drive forces normally generated within motor-gearbox assembly 600 and/or within the spindle-type rotary-to-linear conversion mechanism to provide augmented or "enhanced" stop and hold lift gate functionality. Since SLSF mechanism 900 is integrated into motor-gearbox assembly 600 using only limited additional parts (in contrast to a stand-alone constant torque device), no increase in the overall length of power drive unit 202 is required so as to provide a cost-effective and robust solution providing controllable and thermally stable supplemental friction which is a significant advancement over conventional solutions. Thus, the present disclosure covers one or more non-limiting variations of SLSF mechanism 900 which requires no or minimal modifications to existing parts, minimal additions to new components, and no additional non-functional dead-lengths required.

Figure 29:
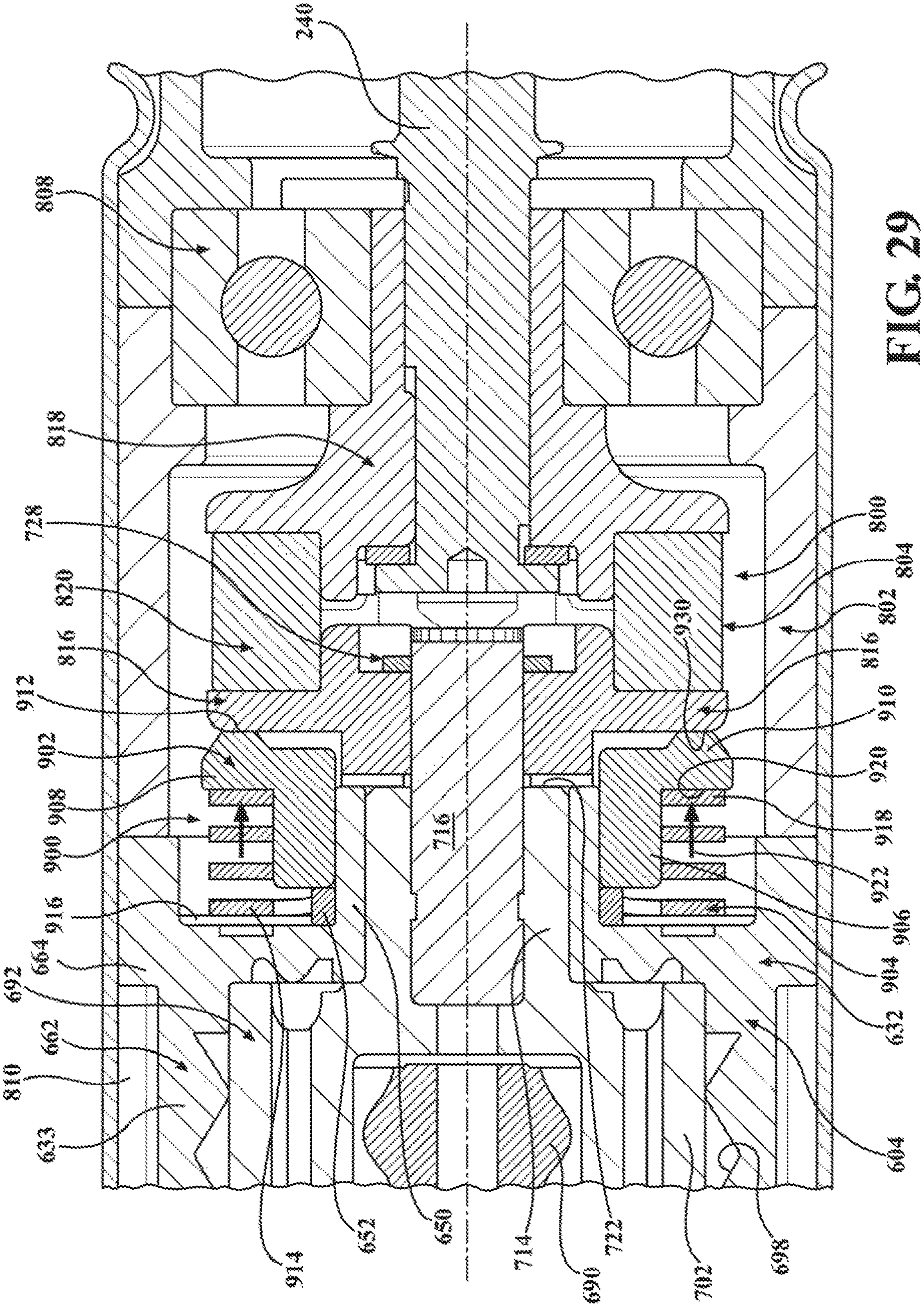
FIG. 29 is a partial sectional view of a modified version of the motor-gearbox assembly shown in FIG. 27 now including a spring-loaded supplemental friction mechanism disposed between the second stage gearset of the dual-planetary geartrain and the flex coupling.
Figure 30:
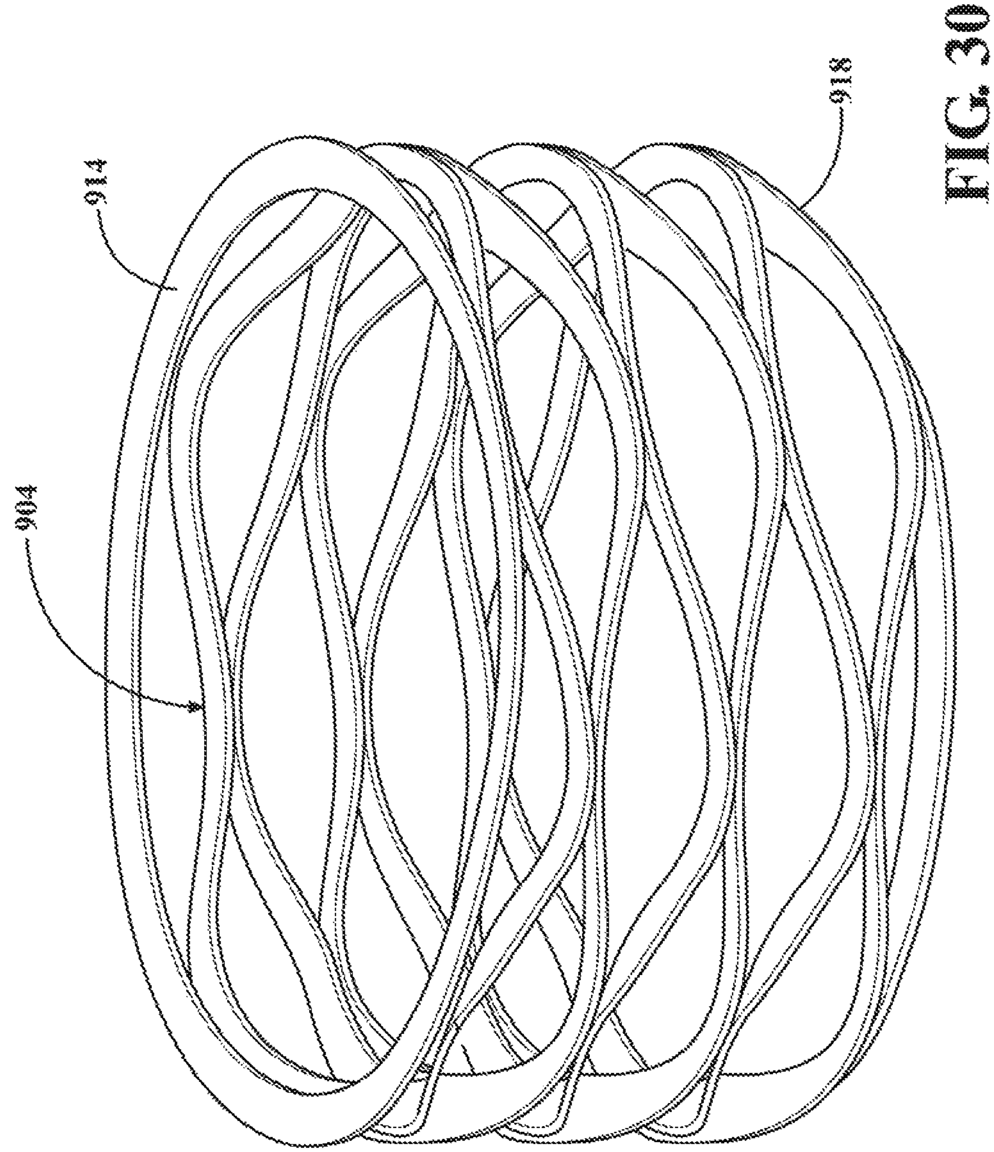
FIG. 30 shows a non-limiting type of wave spring used with the spring-loaded supplemental friction mechanism shown in FIG. 29.
Figure 31:
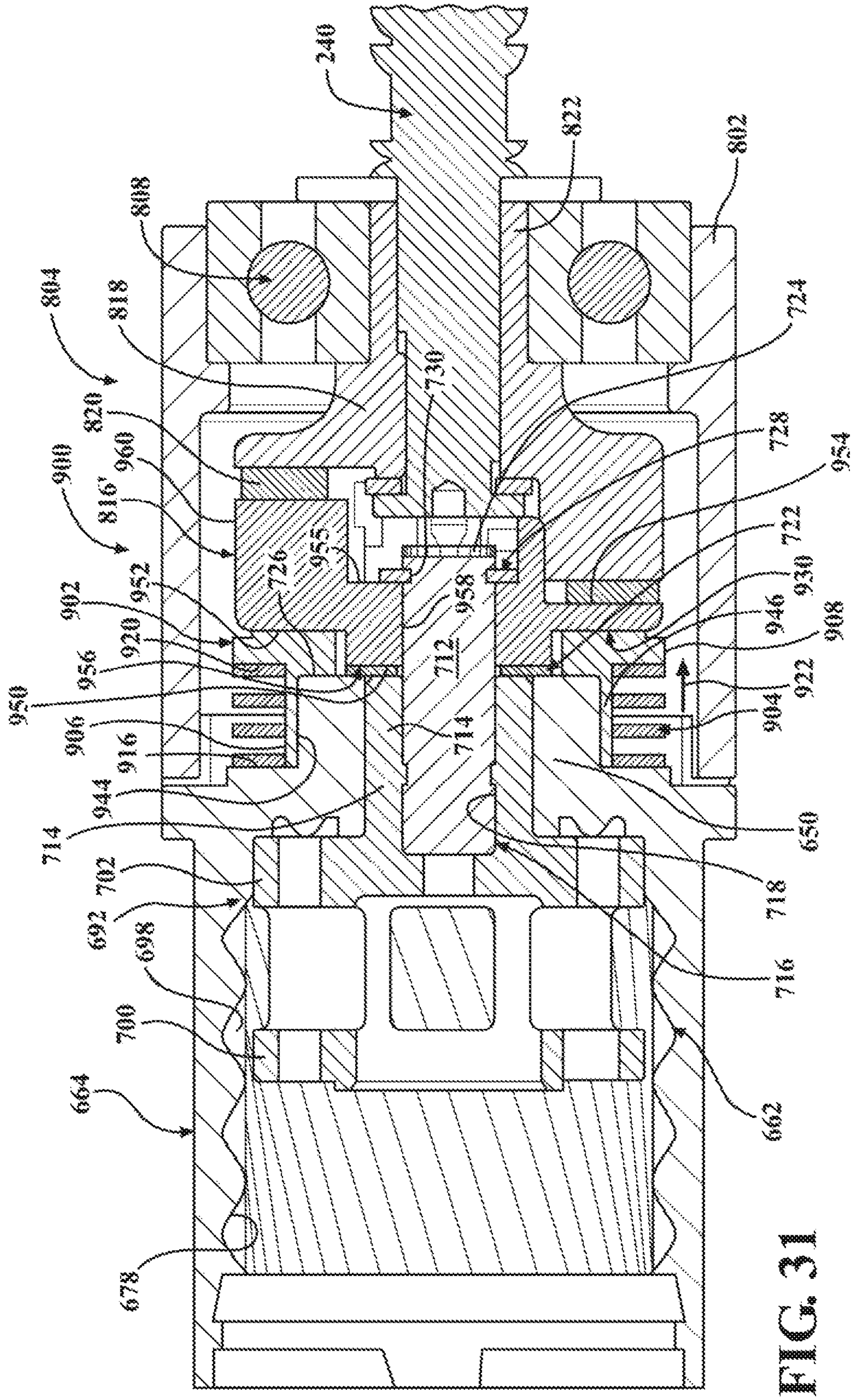
FIG. 31 is a sectional view of a partially-assembled gearbox unit associated with another modified version of the motor-gearbox assembly and including an alternative embodiment of the spring-loaded supplemental friction mechanism operably disposed between the second stage gearset of the dual-planetary geartrain and the flex coupling.
Figure 32:
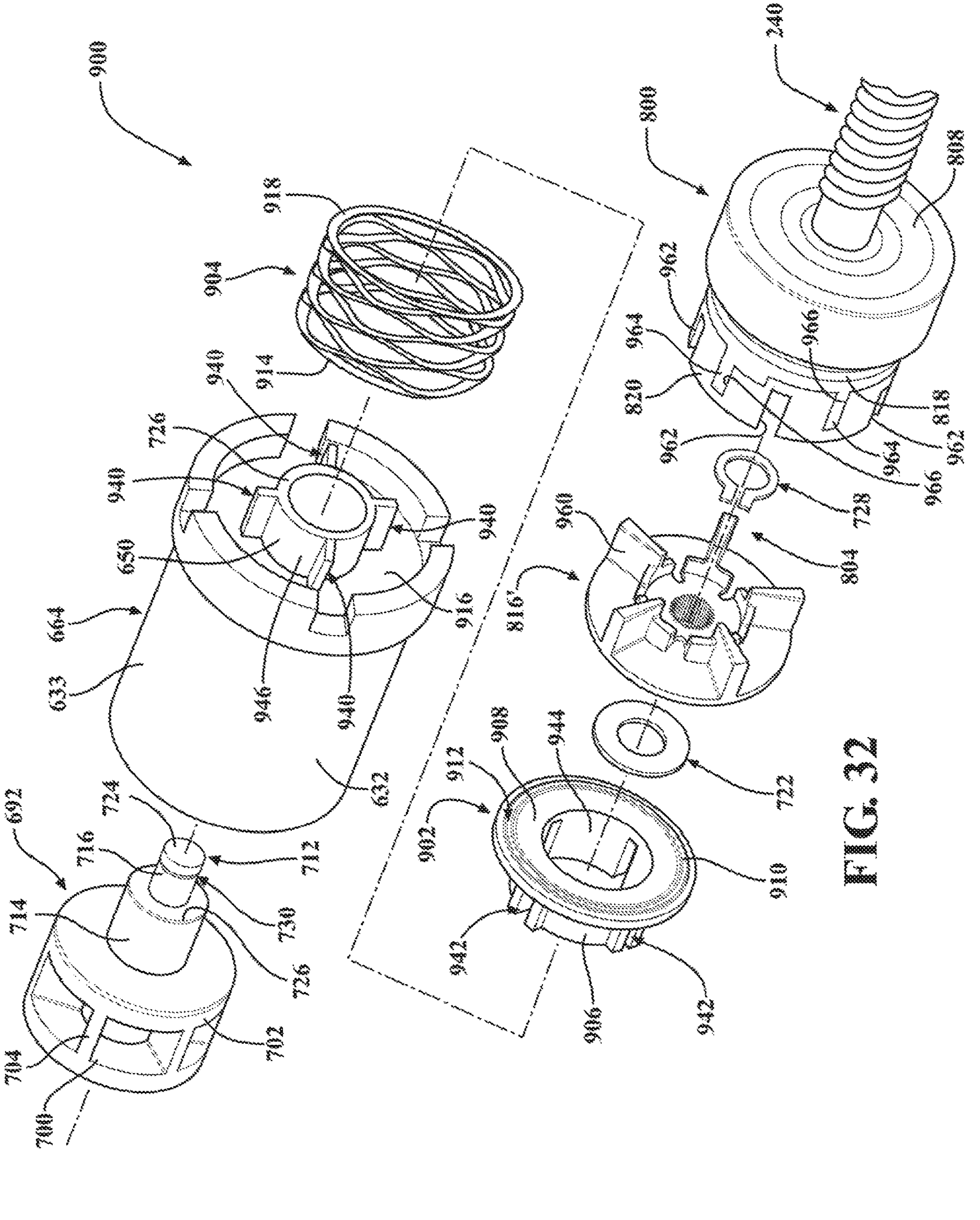
FIG. 32 is an exploded isometric view of the components shown in FIG. 31 to better illustrate the structure and friction of the spring-loaded supplemental friction mechanism.
Figure 33A:
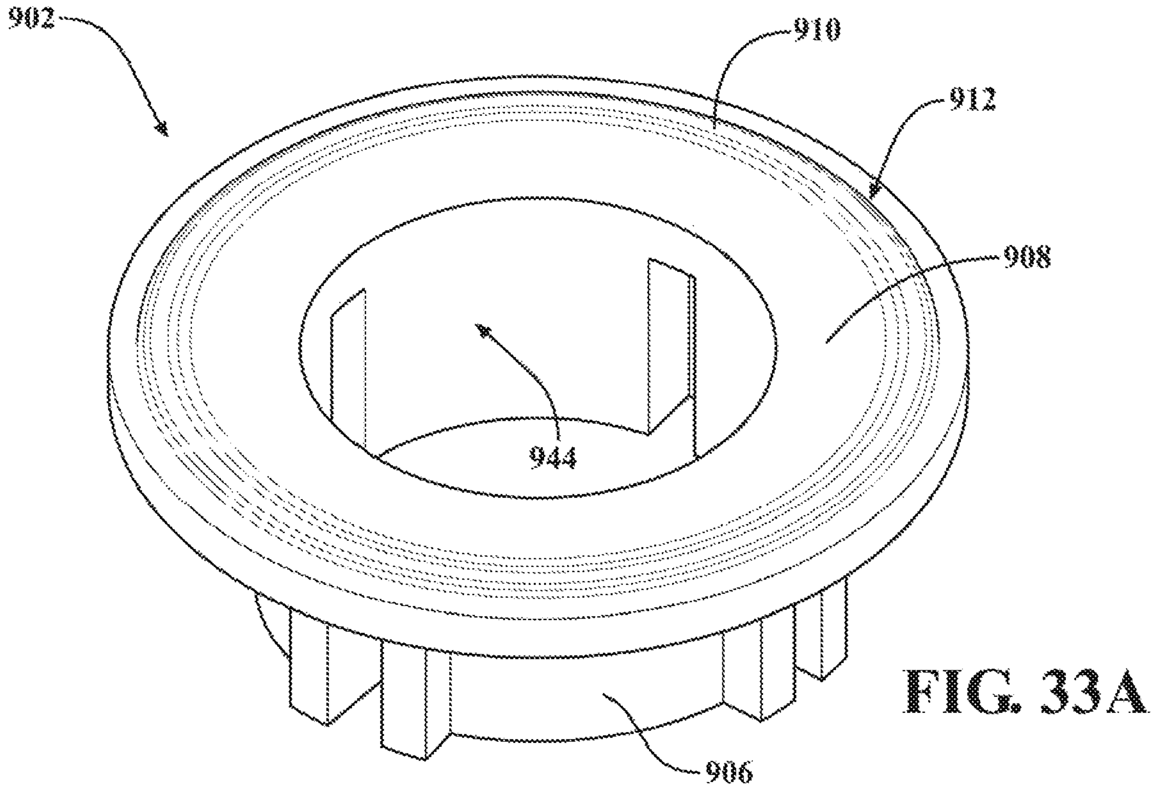
FIGS. 33A and 33B are top and bottom isometric views of the contact ring shown in FIGS. 31 and 32 in association with the spring-loaded supplemental friction mechanism.
Figure 33B:
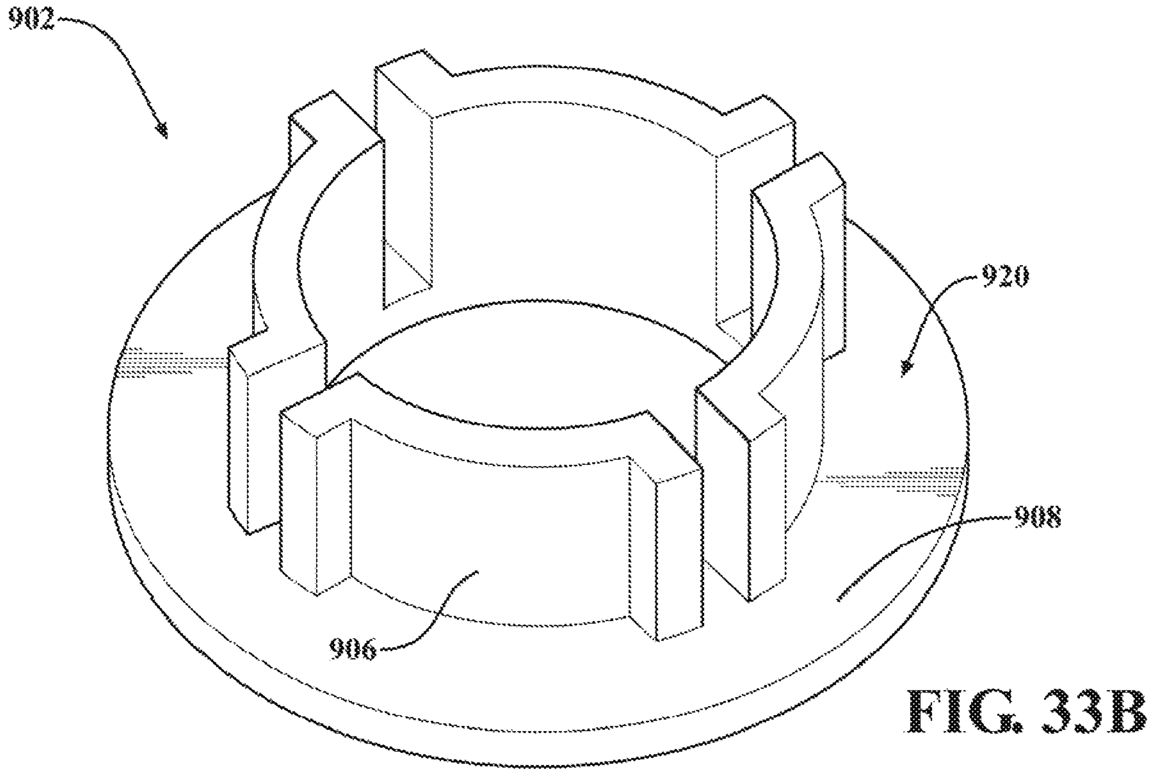
Figure 34A:
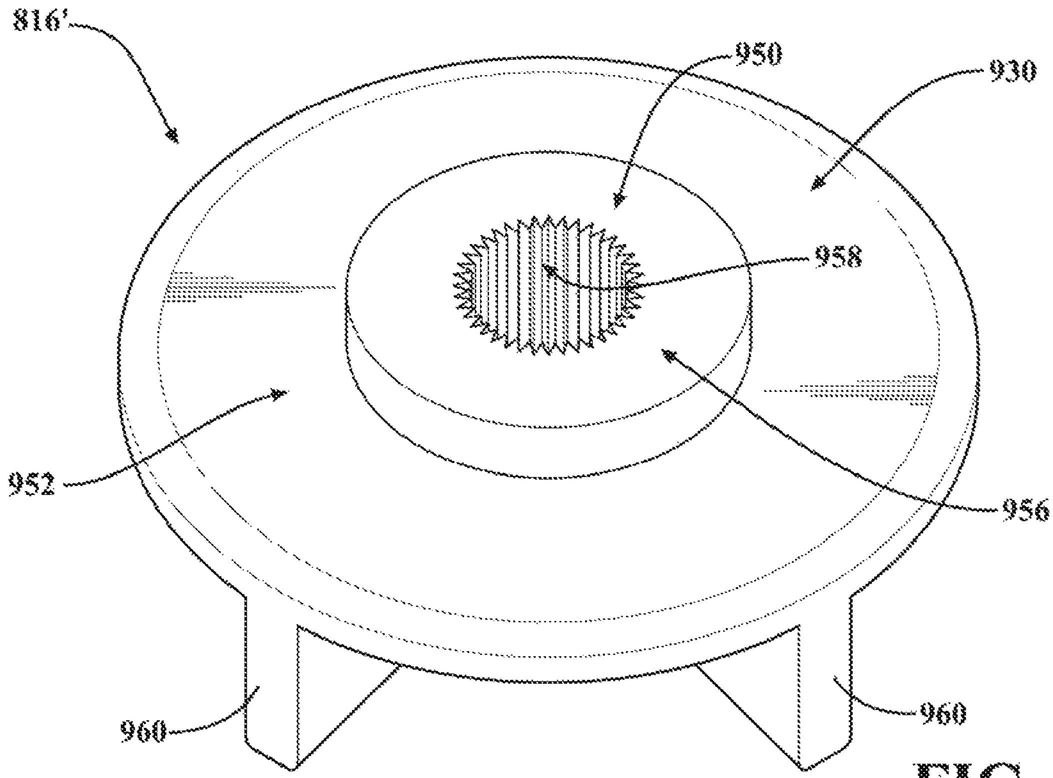
FIGS. 34A and 34B are top and bottom views of the adaptor shown in FIGS. 31 and 32 in association with the spring-loaded supplemental friction mechanism.
Figure 34B:
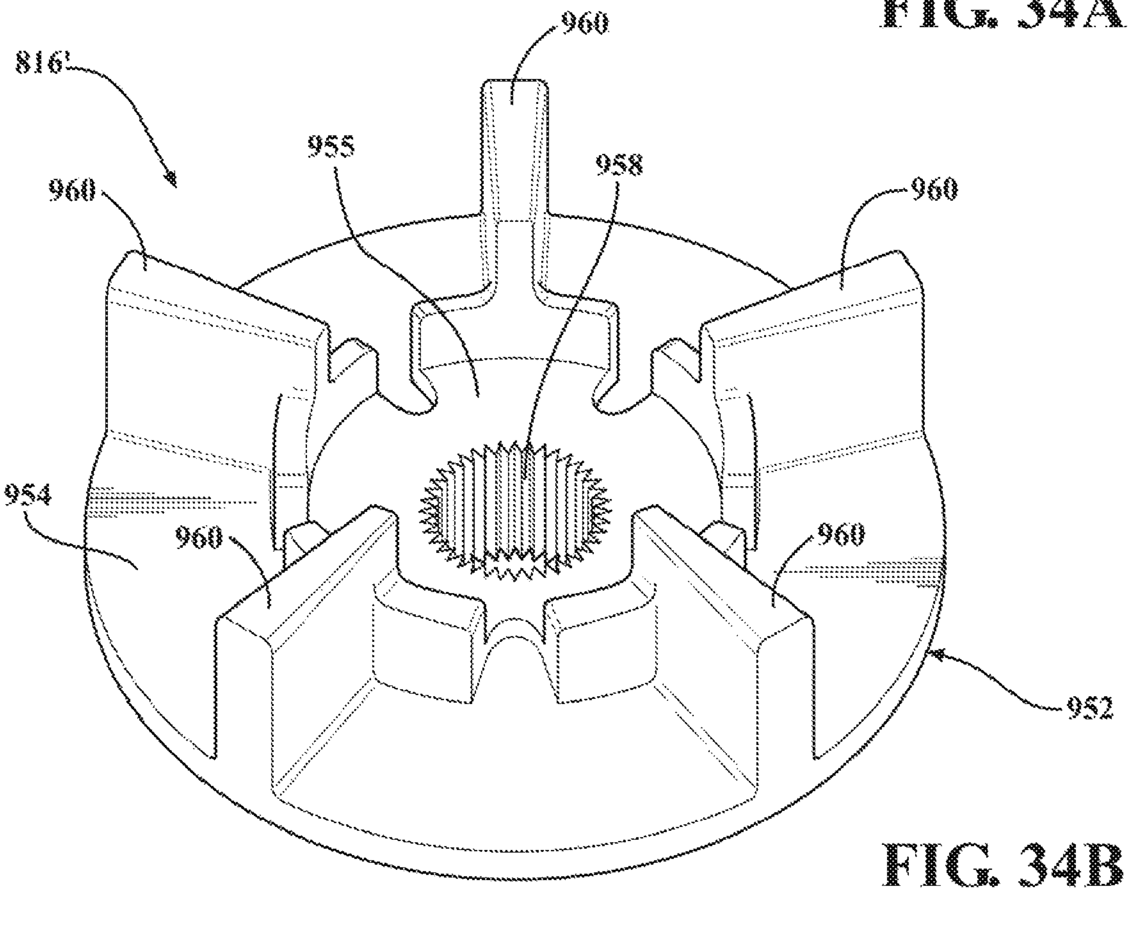

Referring now to FIGS. 29 and 30, a first embodiment of SLSF mechanism 900 is shown generally located between motor-gearbox assembly 600 and drive member 240, and more particularly, by way of example and without limitation, between tubular boss segment 650 of ring gear 664 and sprag ring 816 of flex coupling assembly 804. SLSF mechanism 900 is generally shown to include a contact ring 902 and a biasing member, such as a coil-type wave spring 904, by way of example and without limitation, as it is contemplated that other types of spring biasing members could be used. The wave spring 904 may be constructed from a thermally stable material, such as metal, though non-metal materials are contemplated herein. Contact ring 902 includes a tubular rim segment 906 supported for axial sliding movement on tubular boss segment 650 of ring gear 664. The contact ring 902 may be formed from a plastic material, or a glass-filled nylon or similar low-wear, stable friction material, or the like. An anti-rotation feature, such as lugs formed on rim segment 906 engaging lugs 652 formed on boss segment 650, functions to couple contact ring 902 to non-rotary ring gear 664. Contact ring 902 also includes a radial pressure plate segment 908 extending radially outwardly from rim segment 906 and having an annular engagement flange 910 extending axially outwardly from rim segment 906 to define a friction contact surface 912. Wave spring 904 generally surrounds rim segment 906 of contact ring 902 in radially aligned relation therewith and has a first end 914 engaging a planar surface 916 of ring gear 664 and a second end 918 engaging a planar surface 920 on pressure plate segment 908 of contact ring 902. As such, wave spring 904 normally biases contact ring 902 in an axial first or "loading" direction, as indicated by arrow 922. Since the wave spring 904 may be constructed from a thermally stable material such as metal, the biasing of the contact ring 902 by the spring 904 will not vary over temperature variations, and as a result the friction in the system will also remain stable over temperature variations.

Friction contact surface 912 of contact ring 902 is shown to remain in constant engagement with a planar reaction contact surface 930 formed on sprag ring 816 of flex coupling assembly 804, as a result of the biasing load 922 applied to contact ring 902 via wave spring 904. As previously disclosed, sprag ring 816 is fixed (i.e. splined) for common rotation with second planet carrier 692 via gearbox output shaft 716. Retainer clip 728 axial positions sprag ring 816 on output shaft 716 via retention in shaft groove 730. Thus, SLSF mechanism 900 applies a normal force to sprag ring 816 which, in turn, axially loads (applies an axial force against) coupling member 820 of flex coupling assembly 804 so as to generate frictional torque resistance in response to relative rotation (i.e. a constant friction is generated in either opposite directions of rotation) between sprag ring 816 and coupler ring 818, thereby generating a supplemental holding force tending to resist backdriving of motor-gearbox assembly 600.

Referring now to FIGS. 31-34, more detailed illustrations are provided for SLSF mechanism 900 to better define the structure and function of its several components in a slightly modified version. Common reference numerals are used to again identify those components that are substantially similar to previously described components, as will be understood by a person possessing ordinary skill in the art described herein. Ring gear 664 is shown with a plurality of four (4) anti-rotation features or lugs 940 extending axially from planar surface 916 along boss segment 650, with the lugs 650 extending radially outwardly from boss segment 650. Rim segment 906 of contact ring 902 is shown to include a similar plurality of four (4) anti-rotation features, shown as grooves 942, arranged and configured to each accept and retain a corresponding one of anti-rotation lugs 940 therein. Thus, contact ring 902 is held stationary via this anti-rotation feature connecting it to ring gear 664, thereby preventing relative rotation between ring gear 664 and contact ring 902, though permitting relative axial movement therebetween. Accordingly, rim segment 906 of contact ring 902 has an inner surface 944 sized (enlarged to provide a slightly loose-fit) and configured to be slideably moveable along and relative to an outer surface 946 of boss segment 650.

FIGS. 31-34 show sprag ring 816' acting as an "adaptor" (as discussed above for adaptor 816) with a raised rim segment 950 and a plate segment 952 having reaction contact surface 930 on one side and a planar surface 954 on the opposite side. Rim segment 950, being raised (extending axially outwardly from plate segment 952), defines an end surface 956 configured to engage washer 722. An internally-splined aperture 958 extends through rim segment 950 and is configured to engage with external splines formed on output shaft 716 such that adaptor 816' is fixed for common rotation with second planet carrier 692. Snap ring 728 engages end surface 955 of a boss extending axially outwardly from planar surface 954 on plate segment 952 of adaptor 816' following installation of adaptor 816' onto output shaft 716. Adaptor 816' is also shown to include a plurality of five (5) equally-spaced drive lugs 960 configured to be received in first slots 962 formed in resilient coupling number 820 so as to establish a first drive interface. Likewise, coupler plate 818 includes a plurality of five (5) equally-spaced driven lugs 964 configured to be received in second slots 966 formed in coupling member 820 so as to establish a second drive interface. First slots 962 are circumferentially offset relative to second slots 966. The first and second drive interfaces are configured to transfer torque between planetary geartrain output shaft 716 and power screw 240.

Wave spring 904 is shown with its first end 914 engaging surface 916 on ring gear 664 and its second end 918 engaging spring contact surface 920 on contact ring 902. Wave spring 904 is compressed when installed to apply the normal force 922 on contact ring 902 which, in turn, causes a frictional torque resisting back-driving movement of power screw 240 relative to output shaft 716 via the spring-load applied to coupling assembly 804 by SLSF mechanism 900.

SLSF mechanism 900 is not limited to use with the dual-planetary geartrain arrangement shown, nor is it limited to use with any specific type of flex coupling assembly. Indeed, a flex-coupling assembly may in another embodiment be eliminated from the motor-gearbox assembly 600. The present disclosure contemplates location of SLSF mechanism 900 in an otherwise non-functional area within a motor-gearbox assembly with a configuration providing a spring force applied to a rotary component in a manner resisting back-drive of this component. The location and size of engagement flange 910 on pressure plate segment 908 of contact ring 902, as well as the configuration of its friction contact surface 912, can be varied to provide customized spring loading so as to vary the amount of supplemental friction introduced into the system. Additionally, other types of spring (Belleville, helical, plate, etc.) can be used in substitution for wave spring 904.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electromechanical strut for moving a pivotal closure member between an open position and a closed position relative to a motor vehicle body, the electromechanical strut, comprising:

- a housing operably connected to one of the pivotal closure member and the motor vehicle body;
- an extensible member operably connected to the other one of the pivotal closure member and the motor vehicle body, said extensible member being moveable in response to rotation of a drive member between a retracted position relative to the housing which corresponds to the closed position of the pivotal closure member and an extended position relative to the housing which corresponds to the open position of the pivotal closure member;
  - a motor-gearbox assembly including an electric motor having a rotary output member configured to drive an input component of a geartrain with an output component of the geartrain being driven at a reduced speed relative to the input component;
- a coupling assembly operably coupling the output component of the geartrain to the drive member; and
  - a supplemental friction mechanism configured to apply a supplemental frictional force to at least one of the geartrain and the coupling assembly.

2. The electromechanical strut of claim 1, wherein the coupling assembly includes a first coupling member fixed for rotation with the output component of the geartrain, a second coupling member fixed for rotation with the drive member, and a third coupling member operably interconnecting the first and second coupling members, and wherein the supplemental friction mechanism is operable to apply the supplemental frictional force to the first coupling member.

3. The electromechanical strut of claim 2, wherein the supplemental frictional force applied to the first coupling member generates a frictional torque in response to relative rotation between the first coupling member and the second coupling member.

4. The electromechanical strut of claim 3, wherein the supplemental friction mechanism includes a contact ring and a biasing member acting to bias the contact ring into constant engagement with the first coupling member and to apply the supplemental frictional force thereon.

5. The electromechanical strut of claim 4, wherein the contact ring is non-rotatable and is axially moveable with respect to the first coupling member, and wherein the biasing member includes at least one spring acting on the contact ring.

6. The electromechanical strut of claim 2, wherein the first coupling member is a sprag ring, wherein the second coupling member is a coupler ring, wherein the third coupling member is a resilient coupler establishing a first drive interface with the sprag ring and a second drive interface with the coupler ring so as to transfer torque between the sprag ring and the coupler ring, and wherein the supplemental friction mechanism includes a contact ring non-rotatably fixed for axial movement relative to the sprag ring and a spring urging the contact ring into engagement with the sprag ring for applying the supplemental frictional force thereto which functions to oppose rotation of the sprag ring relative to the contact ring.

7. The electromechanical strut of claim 6, wherein the geartrain includes a first gear component fixed for rotation with the rotary output member of the electric motor, a second gear component fixed for rotation with the sprag ring, and a stationary third gear component, wherein the contact ring is supported for axial movement relative to the third gear component, and wherein an anti-rotation feature prevents rotation of the contact ring relative to the third gear component.

8. The electromechanical strut of claim 7, wherein the first gear component is a sun gear, wherein the second gear component includes a planet carrier rotatably supporting planet gears, wherein the third gear component is a fixed ring gear, and wherein the planet gears are meshed with the sun gear and the fixed ring gear.

9. The electromechanical strut of claim 2, wherein the geartrain includes a first stage gearset having a first stage input component driven by the rotary output member of the electric motor and a first stage output component, wherein the geartrain further includes a second stage gearset having a second stage input component driven by the first stage output component and a second stage output component fixed to the first coupling member, wherein drive lugs formed on the first coupling member are seated in first slots formed in the third coupling member to define a first drive interface, and wherein driven lugs formed on the second coupling member are seated in second slots formed in the third coupling member to define a second drive interface.

10. The electromechanical strut of claim 9, wherein the first slots are circumferentially offset relative to the second slots.

11. An electromechanical strut for moving a pivotal closure member between an open position and a closed position relative to a motor vehicle body, the electromechanical strut, comprising:

a housing operably connected to one of the pivotal closure member and the motor vehicle body;

an extensible member operably connected to the other one of the pivotal closure member and the motor vehicle body, said extensible member being moveable axially in response to rotation of a drive member between an axially retracted position relative to the housing which corresponds to the closed position of the pivotal closure member and an axially extended position relative to the housing which corresponds to the open position of the pivotal closure member;

a motor-gearbox assembly including an electric motor having a rotary output member configured to drive an input component of a geartrain with an output component of the geartrain being driven at a reduced speed relative to the input component;

a coupling assembly operably coupling the output component of the geartrain to the drive member; and a supplemental friction mechanism disposed between the geartrain and the coupling assembly, the supplemental friction mechanism including a biasing member compressed axially between the geartrain and the coupling assembly to apply a supplemental frictional force to at least one of the geartrain and the coupling assembly.

12. The electromechanical strut of claim 11, wherein the biasing member is a spring.

13. The electromechanical strut of claim 11, wherein the supplemental friction mechanism includes a contact ring disposed between the biasing member and the coupling assembly, the biasing member biasing the contact ring into continuous engagement with the coupling assembly and applying the supplemental frictional force thereon.

14. The electromechanical strut of claim 13, wherein the coupling assembly includes a first coupling member fixed for rotation with the output component of the geartrain, a second coupling member fixed for rotation with the power screw, and a resilient third coupling member operably interconnecting the first and second coupling members.

15. The electromechanical strut of claim 14, and wherein the biasing member is operable to apply the supplemental frictional force to the first coupling member.

16. The electromechanical strut of claim 15, wherein the supplemental frictional force applied to the first coupling member generates a frictional torque in response to relative rotation between the first coupling member and the second coupling member.

17. The electromechanical strut of claim 16, wherein the contact ring is non-rotatable and axially moveable with respect to the first coupling member, and wherein the biasing member is at least one spring acting on the contact ring.

18. The electromechanical strut of claim 17, wherein the first coupling member is a sprag ring, wherein the second coupling member is a coupler ring, wherein the resilient third coupling member establishes a first drive interface with the sprag ring and a second drive interface with the coupler ring so as to transfer torque between the sprag ring and the coupler ring.

19. The electromechanical strut of claim 18, wherein the geartrain includes a first gear component fixed for rotation with the rotary output member of the electric motor, a second gear component fixed for rotation with the sprag ring, and a stationary third gear component, wherein the contact ring is supported for axial movement relative to the third gear component, and wherein an anti-rotation feature prevents rotation of the contact ring relative to the third gear component.

20. The electromechanical strut of claim 19, wherein the first gear component is a sun gear, wherein the second gear component includes a planet carrier rotatably supporting planet gears, wherein the third gear component is a fixed ring gear, and wherein the planet gears are meshed with the sun gear and the ring gear.

* * * * *